US012463026B2

(12) United States Patent
Kaneko et al.

(10) Patent No.: US 12,463,026 B2
(45) Date of Patent: Nov. 4, 2025

(54) MACHINE DIFFERENCE CORRECTION METHOD FOR MASS SPECTROMETRY APPARATUS

(71) Applicant: Shimadzu Corporation, Kyoto (JP)

(72) Inventors: Naoki Kaneko, Kyoto (JP); Tatsuki Okubo, Kyoto (JP); Tomonori Oshikawa, Kyoto (JP); Yuko Kobayashi, Kyoto (JP); Yoshiki Tainaka, Kyoto (JP); Kohei Suzuki, Kyoto (JP); Takashi Nishikaze, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 378 days.

(21) Appl. No.: 18/019,626

(22) PCT Filed: Jan. 6, 2021

(86) PCT No.: PCT/JP2021/000235

§ 371 (c)(1),
(2) Date: Mar. 7, 2023

(87) PCT Pub. No.: WO2022/030032

PCT Pub. Date: Feb. 10, 2022

(65) Prior Publication Data

US 2024/0266158 A1 Aug. 8, 2024

Related U.S. Application Data

(60) Provisional application No. 63/062,677, filed on Aug. 7, 2020.

(51) Int. Cl.
*H01J 49/00* (2006.01)

(52) U.S. Cl.
CPC ................................ *H01J 49/0009* (2013.01)

(58) Field of Classification Search
CPC ........ H01J 49/00; H01J 49/02; H01J 49/0009; H01J 49/0027; H01J 49/26
USPC ........................................ 250/281, 288, 282
See application file for complete search history.

(56) References Cited

U.S. PATENT DOCUMENTS

| | | | | |
|---|---|---|---|---|
| 2007/0158542 | A1 | 7/2007 | Bauer et al. | |
| 2008/0201095 | A1 * | 8/2008 | Yip | H01J 49/0009 702/85 |
| 2009/0039246 | A1 * | 2/2009 | Beecher | G01N 33/5038 250/282 |
| 2011/0012013 | A1 * | 1/2011 | Remes | H01J 49/0009 250/252.1 |

(Continued)

FOREIGN PATENT DOCUMENTS

| | | | |
|---|---|---|---|
| CN | 106574930 | A | 4/2017 |
| JP | H10-010049 | A | 1/1998 |

(Continued)

OTHER PUBLICATIONS

Extended European Search Report (EESR) dated Aug. 29, 2024 for corresponding application No. EP 21852833.9.

(Continued)

*Primary Examiner* — Jason L McCormack
(74) *Attorney, Agent, or Firm* — Muir Patent Law, PLLC

(57) ABSTRACT

The present disclosure provides a method for calibrating a difference in signal intensity ratio between machines in mass spectrometry.

13 Claims, 23 Drawing Sheets

Specification includes a Sequence Listing.

Aβ and Aβ-related peptides were measured by three mass spectrometers (Performance 1, Performance 2, and Performance 3) after immunoprecipitation (IP) of a blood plasma sample (Sample No. 1) spiked with an internal standard peptide (SIL-Aβ1-38). The peak intensity ratio (A) of each of the Aβ and Aβ related peptides relative to SIL-Aβ1-38; and the peak intensity ratio (B) of each of the Aβ, Aβ related peptides, and SIL-Aβ1-38 relative to APP669-711 were shown.

(56) References Cited

U.S. PATENT DOCUMENTS

| | | | |
|---|---|---|---|
| 2017/0148617 A1 | 5/2017 | Akiyama et al. |
| 2017/0184573 A1 | 6/2017 | Kaneko et al. |
| 2018/0238909 A1 | 8/2018 | Kaneko et al. |
| 2018/0315587 A1 | 11/2018 | Beecher et al. |

FOREIGN PATENT DOCUMENTS

| | | | |
|---|---|---|---|
| JP | 2007-503001 | A | 2/2007 |
| JP | 2017-102100 | A | 6/2017 |
| JP | 2020-511671 | A | 4/2020 |
| WO | 2015/178398 | A1 | 11/2015 |
| WO | 2017/047529 | A1 | 3/2017 |
| WO | 2019/236776 | A1 | 12/2019 |

OTHER PUBLICATIONS

Kaneko et al., "Novel plasma biomarker surrogating cerebral amyloid deposition," Proceedings of the Japan Academy, Series B, 90(9): 353-364 (2014).

Nakamura et al., "High performance plasma amyloid-B biomarkers for Alzheimer's disease," Nature, 554 (7691): 249-254 (2018).

Nicol et al., "Use of an immunoaffinity-mass spectrometry-based approach for the quantification of protein biomarkers from serum samples of lung cancer patients," Molecular & Cellular Proteomics, 7 (10): 1974-1982 (2008).

Han et al., "Quantitative profiling of differentiation-induced microsomal proteins using isotope-coded affinity tags and mass spectrometry," Nature Biotechnology, 19 (10): 946-951 (2001).

Ross et al., "Multiplexed protein quantitation in *Saccharomyces cerevisiae* using amine-reactive isobaric tagging reagents," Molecular & Cellular Proteomics, 3 (12): 1154-1169 (2004).

International Search Report issued in corresponding International Patent Application No. PCT/JP2021/000235 dated Apr. 6, 2021.

International Preliminary Report on Patentability and Written Opinion issued in corresponding International Patent Application No. PCT/JP2021/000235 dated Feb. 16, 2023.

First Office Action dated Jul. 8, 2025 issued for corresponding Chinese Patent Application No. 202180056975.4.

* cited by examiner

Fig.1

(A)

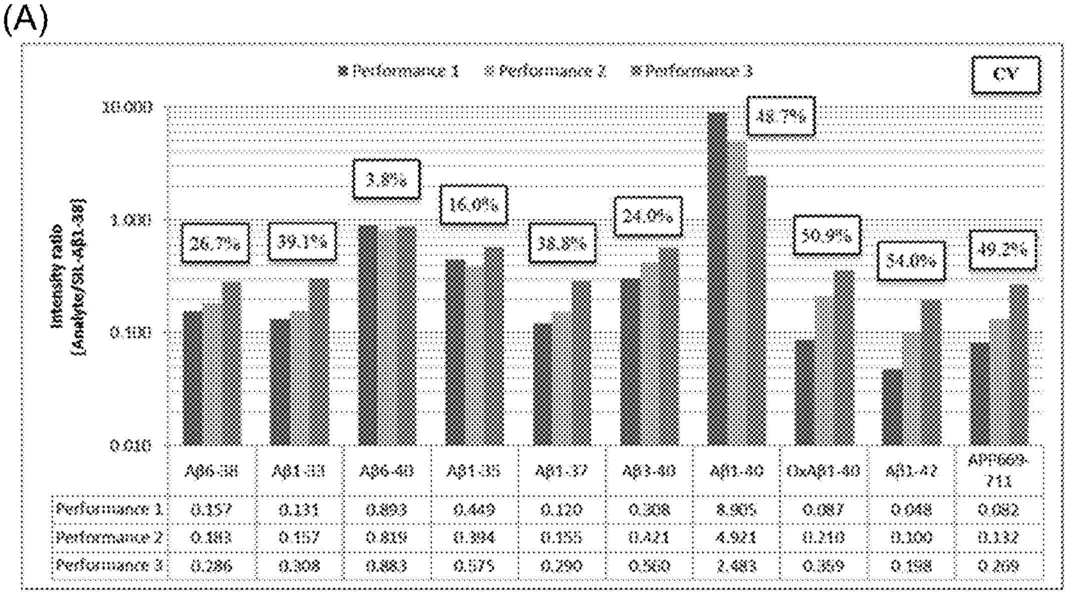

(B)

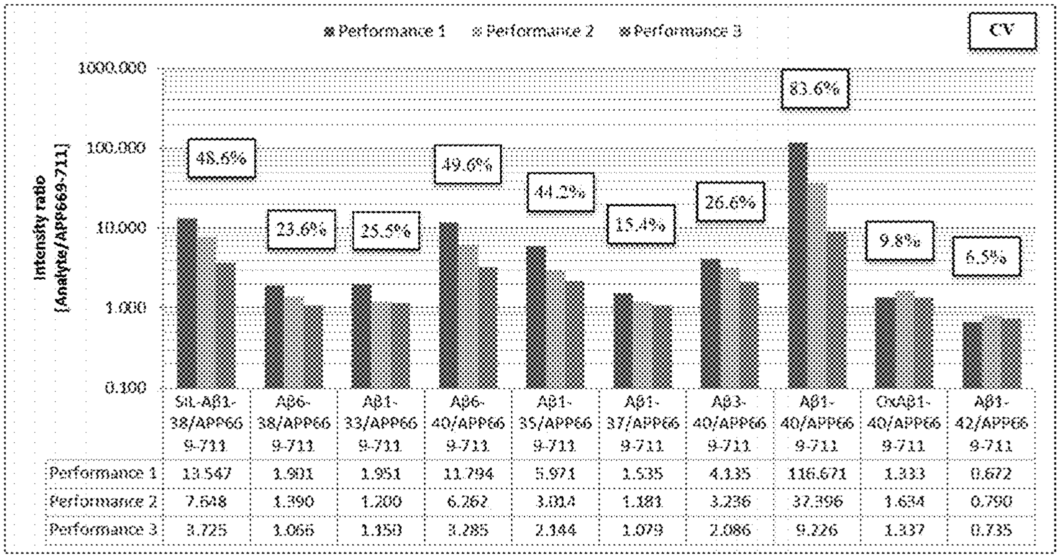

Aβ and Aβ-related peptides were measured by three mass spectrometers (Performance 1, Performance 2, and Performance 3) after immunoprecipitation (IP) of a blood plasma sample (Sample No. 1) spiked with an internal standard peptide (SIL-Aβ1-38). The peak intensity ratio (A) of each of the Aβ and Aβ related peptides relative to SIL-Aβ1-38; and the peak intensity ratio (B) of each of the Aβ, Aβ related peptides, and SIL-Aβ1-38 relative to APP669-711 were shown.

Fig. 2 is a diagram in which a vertical axis represents a coefficient of variation (CV) of the peak intensity ratios measured by the three mass spectrometers (Performance 1, Performance 2, and Performance 3) after IP of the blood plasma sample (Sample No. 1), and a horizontal axis represents the average of the peak intensity ratios measured by the three mass spectrometers.

Fig.3

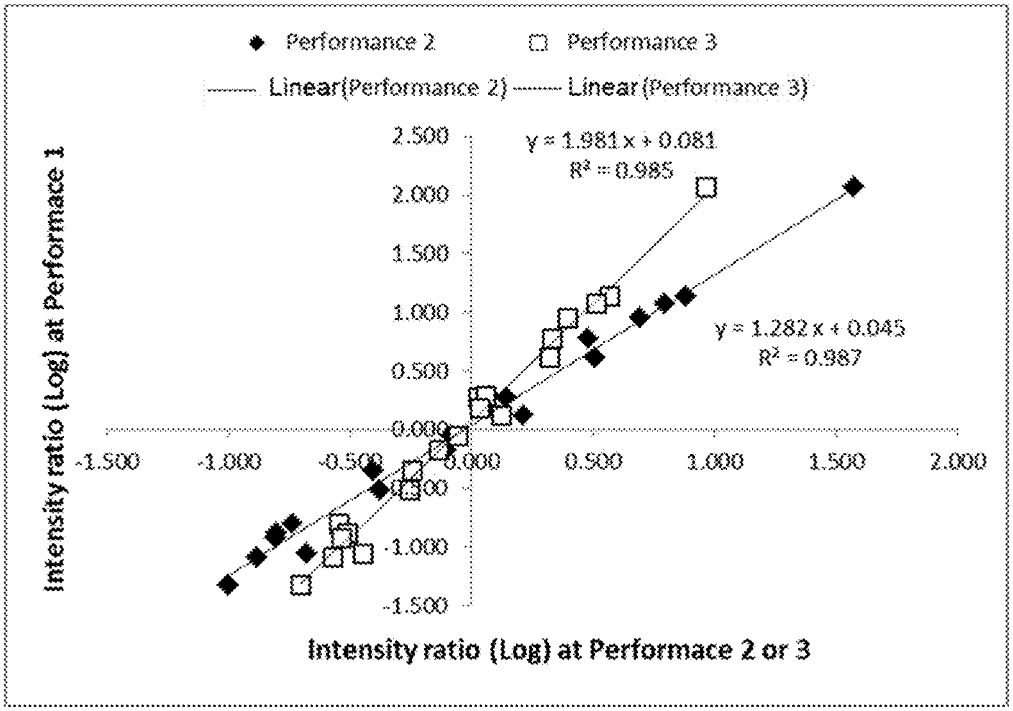

Fig. 3 is a diagram in which a vertical axis represents a value obtained by logarithmic transformation of each peak intensity ratio measured by Performance 1 (standard machine) after IP of the blood plasma sample (Sample No. 1), a horizontal axis represents a value obtained by logarithmic transformation of each peak intensity ratio determined by measurement of the same sample by Performance 2 or 3, and a linear regression equation of the measured values of Performance 2 or 3 with respect to the measured values of Performance 1 (standard machine) and a coefficient of determination ($R^2$) are shown.

Fig.4

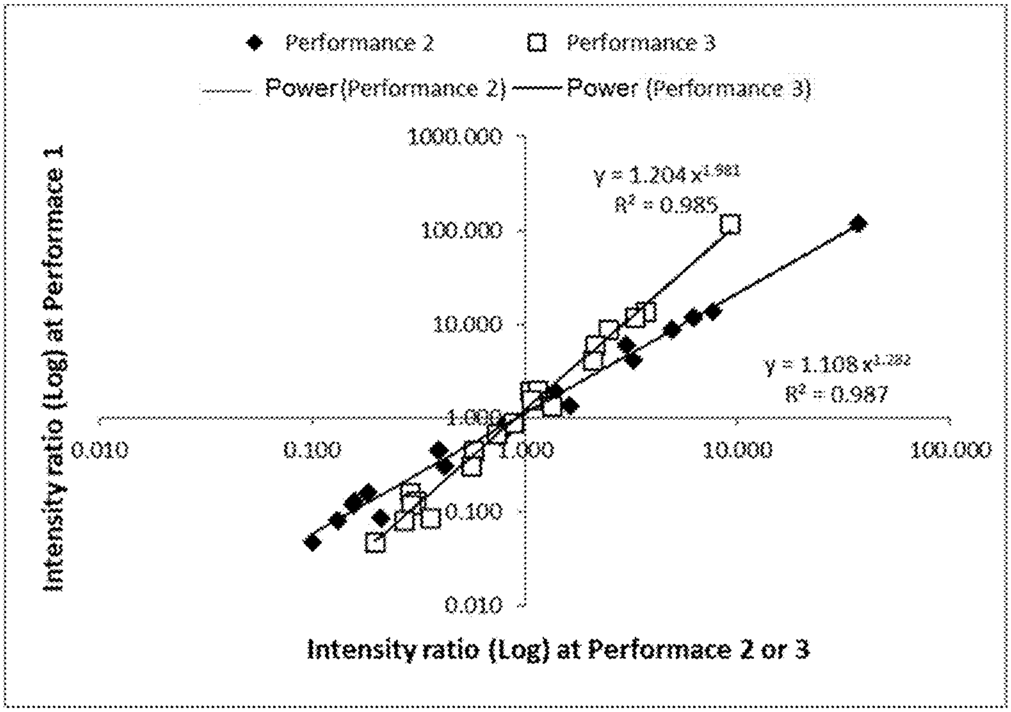

Fig. 4 is a diagram in which a vertical axis represents each peak intensity ratio measured by Performance 1 (standard machine) after IP of the blood plasma sample (Sample No. 1), a horizontal axis represents each peak intensity ratio determined by measurement of the same sample by Performance 2 or 3, and a power approximate equation of the measured values of Performance 2 or 3 with respect to the measured values of Performance 1 (standard machine) and a coefficient of determination ($R^2$) are shown.

Fig.5

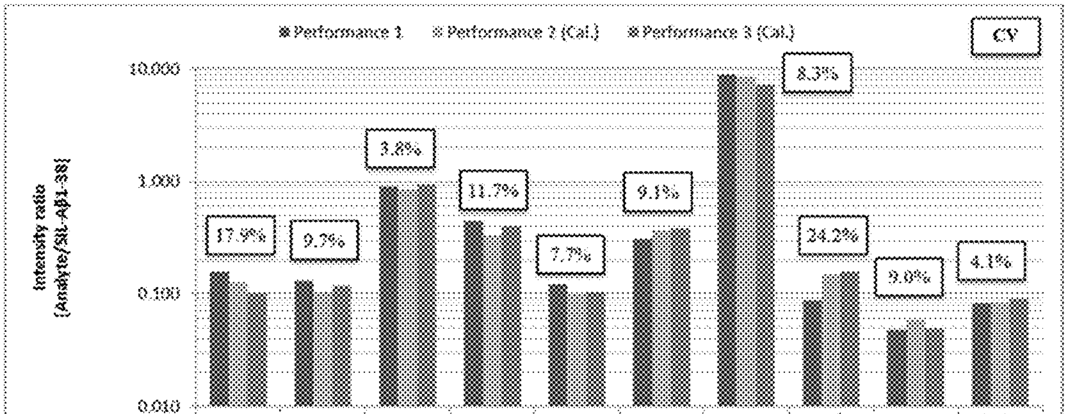

| | Aβ6-38 | Aβ1-33 | Aβ6-40 | Aβ1-35 | Aβ1-37 | Aβ3-40 | Aβ1-40 | OxAβ1-40 | Aβ1-42 | APP669-711 |
|---|---|---|---|---|---|---|---|---|---|---|
| Performance 1 | 0.157 | 0.131 | 0.893 | 0.449 | 0.120 | 0.308 | 8.905 | 0.087 | 0.048 | 0.082 |
| Performance 2 (Cal.) | 0.126 | 0.104 | 0.859 | 0.336 | 0.102 | 0.366 | 8.554 | 0.150 | 0.058 | 0.083 |
| Performance 3 (Cal.) | 0.101 | 0.117 | 0.942 | 0.402 | 0.104 | 0.383 | 7.301 | 0.158 | 0.049 | 0.089 |

Fig. 5 shows values obtained by calibrating the peak intensity ratios of the Aβ and Aβ related peptides relative to the internal standard peptide (SIL-Aβ1-38) measured by Performance 2 and Performance 3 using calibration formulas to be equivalent to the peak intensity ratios measured by Performance 1 (standard machine). Performance 2 (Cal.) and Performance 3 (Cal.) mean such calibrated values.

Fig.6

(A) Sample No.2 before calibration

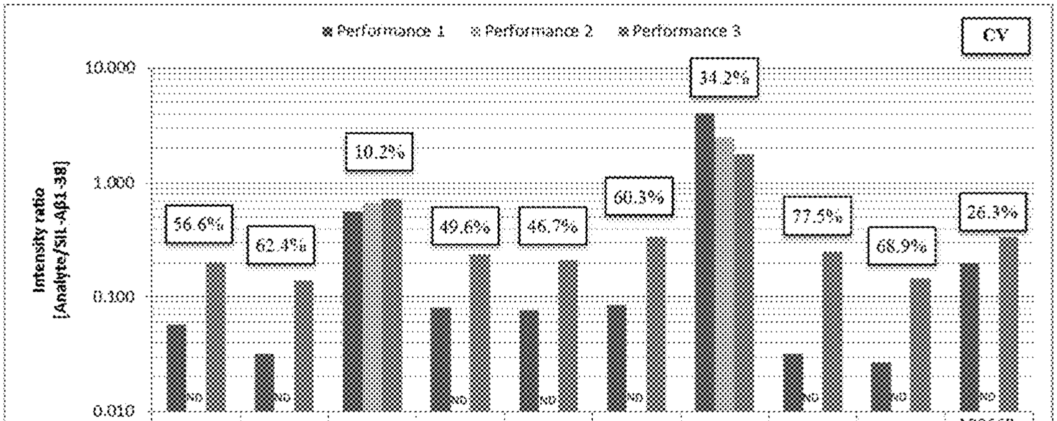

| | Aβ6-38 | Aβ1-33 | Aβ6-40 | Aβ5-40 | Aβ1-35 | Aβ3-40 | Aβ1-40 | OxAβ1-40 | Aβ1-42 | APP669-711 |
|---|---|---|---|---|---|---|---|---|---|---|
| Performance 1 | 0.057 | 0.032 | 0.558 | 0.080 | 0.076 | 0.084 | 4.051 | 0.032 | 0.027 | 0.199 |
| Performance 2 | ND | ND | 0.666 | ND | ND | ND | 2.482 | ND | ND | ND |
| Performance 3 | 0.204 | 0.139 | 0.715 | 0.239 | 0.209 | 0.340 | 1.784 | 0.250 | 0.146 | 0.340 |

(B) Sample No.2 after calibration

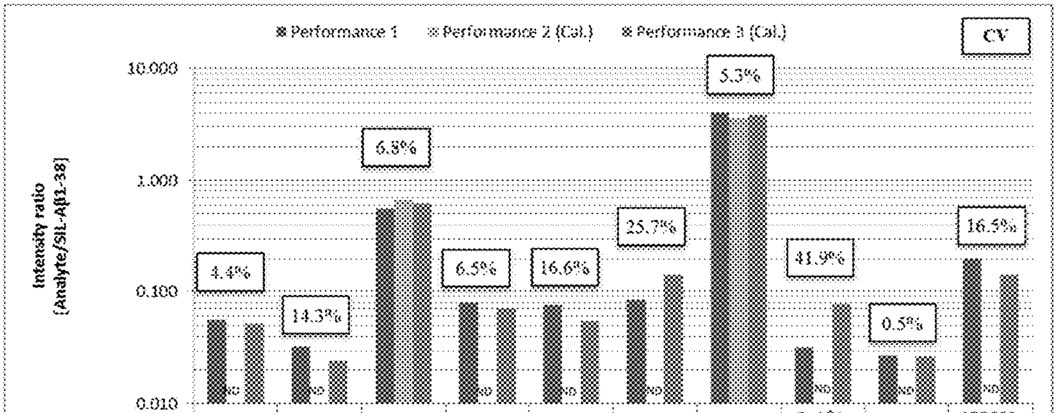

| | Aβ6-38 | Aβ1-33 | Aβ6-40 | Aβ5-40 | Aβ1-35 | Aβ3-40 | Aβ1-40 | OxAβ1-40 | Aβ1-42 | APP669-711 |
|---|---|---|---|---|---|---|---|---|---|---|
| Performance 1 | 0.057 | 0.032 | 0.558 | 0.080 | 0.076 | 0.084 | 4.051 | 0.032 | 0.027 | 0.199 |
| Performance 2 (Cal.) | ND | ND | 0.659 | ND | ND | ND | 3.558 | ND | ND | ND |
| Performance 3 (Cal.) | 0.052 | 0.024 | 0.620 | 0.071 | 0.054 | 0.143 | 3.795 | 0.077 | 0.027 | 0.142 |

The blood plasma sample (Sample No. 2) was measured by Performance 1, Performance 2, and Performance 3 after IP. Fig. 6 shows the peak intensity ratios of Aβ and Aβ related peptides relative to SIL-Aβ1-38 measured by Performance 2 and Performance 3 before (A) and after (B) calibration using calibration formulas. Performance 2 (Cal.) and Performance 3 (Cal.) mean such calibrated values.

Fig.7

(A) Sample No.3 before calibration

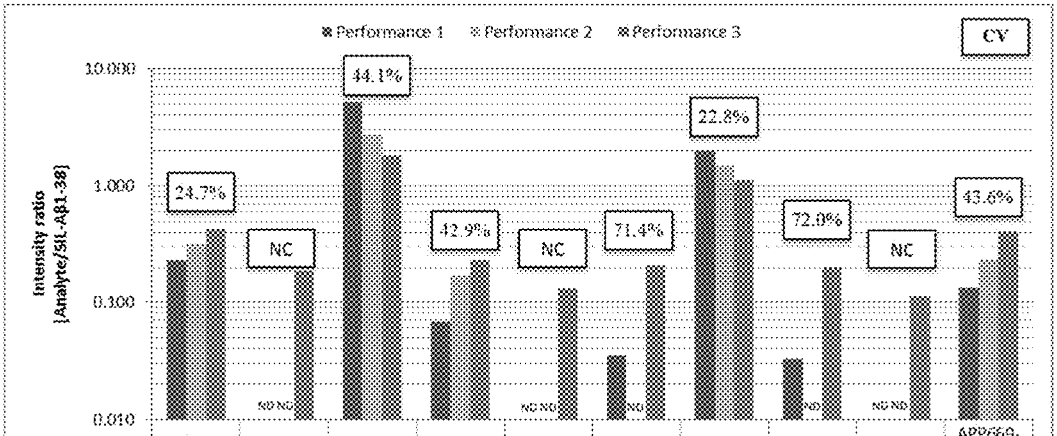

| | Aβ6-38 | Aβ1-33 | Aβ6-40 | Aβ5-40 | Aβ1-35 | Aβ3-40 | Aβ1-40 | OxAβ1-40 | Aβ1-42 | APP669-711 |
|---|---|---|---|---|---|---|---|---|---|---|
| Performance 1 | 0.230 | ND | 5.184 | 0.068 | ND | 0.035 | 1.969 | 0.033 | ND | 0.134 |
| Performance 2 | 0.318 | ND | 2.728 | 0.170 | ND | ND | 1.479 | ND | ND | 0.235 |
| Performance 3 | 0.426 | 0.185 | 1.798 | 0.230 | 0.132 | 0.210 | 1.123 | 0.202 | 0.114 | 0.407 |

(B) Sample No.3 after calibration

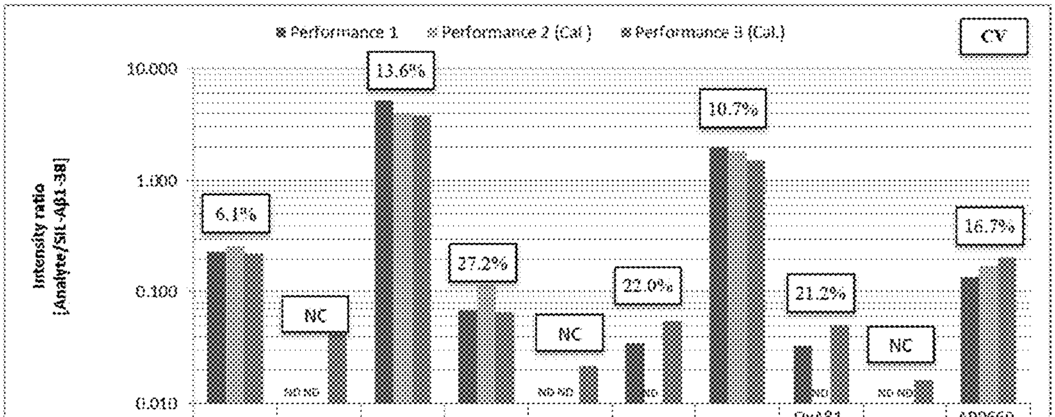

| | Aβ6-38 | Aβ1-33 | Aβ6-40 | Aβ5-40 | Aβ1-35 | Aβ3-40 | Aβ1-40 | OxAβ1-40 | Aβ1-42 | APP669-711 |
|---|---|---|---|---|---|---|---|---|---|---|
| Performance 1 | 0.230 | ND | 5.184 | 0.068 | ND | 0.035 | 1.969 | 0.033 | ND | 0.134 |
| Performance 2 (Cal.) | 0.255 | ND | 4.016 | 0.114 | ND | ND | 1.833 | ND | ND | 0.173 |
| Performance 3 (Cal.) | 0.222 | 0.042 | 3.851 | 0.066 | 0.022 | 0.055 | 1.517 | 0.051 | 0.016 | 0.204 |

The blood plasma sample (Sample No. 3) was measured by Performance 1, Performance 2, and Performance 3. Fig. 7 shows the peak intensity ratios of the Aβ and Aβ related peptides relative to SIL-Aβ1-38 measured by Performance 2 and Performance 3 before (A) and after (B) calibration using calibration formulas. Performance 2 (Cal.) and Performance 3 (Cal.) mean such calibrated values.

Fig.8

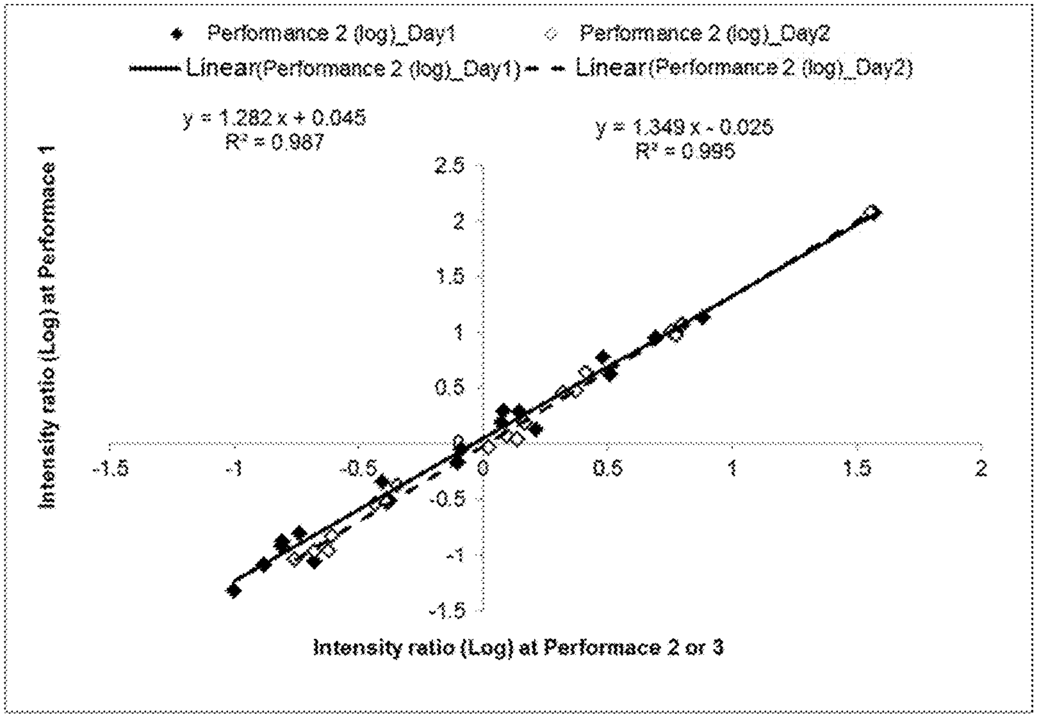

IP-MS of the blood plasma sample (Sample No. 1) was performed in different two days (Day 1 and Day 2). A vertical axis represents a value obtained by logarithmic transformation of each peak intensity ratio measured by Performance 1 (standard machine) in each day, a horizontal axis represents a value obtained by logarithmic transformation of each peak intensity ratio measured by Performance 2, and a linear regression equation of the measured values of Performance 2 with respect to the measured values of Performance 1 and a coefficient of determination ($R^2$) are shown in the diagram.

Fig.9

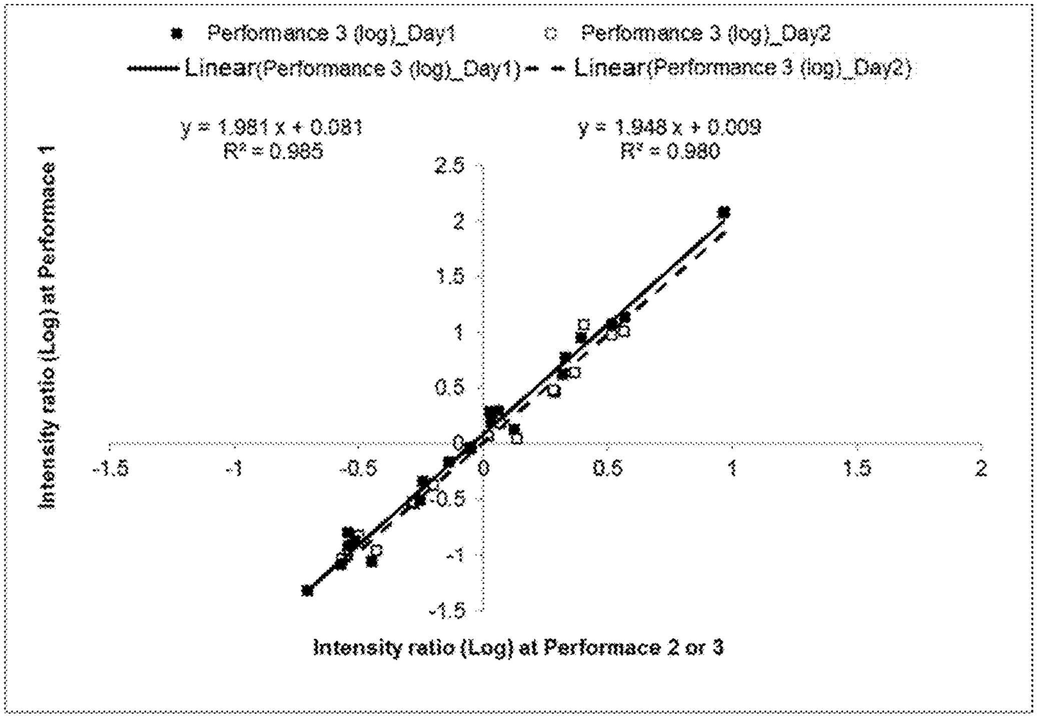

IP-MS of the blood plasma sample (Sample No. 1) was performed in different two days (Day 1 and Day 2). A vertical axis represents a value obtained by logarithmic transformation of each peak intensity ratio measured by Performance 1 (standard machine) in each day, a horizontal axis represents a value obtained by logarithmic transformation of each peak intensity ratio measured by Performance 3, and a linear regression equation of the measured values of Performance 3 with respect to the measured values of Performance 1 and a coefficient of determination ($R^2$) are shown in the diagram.

Fig.10

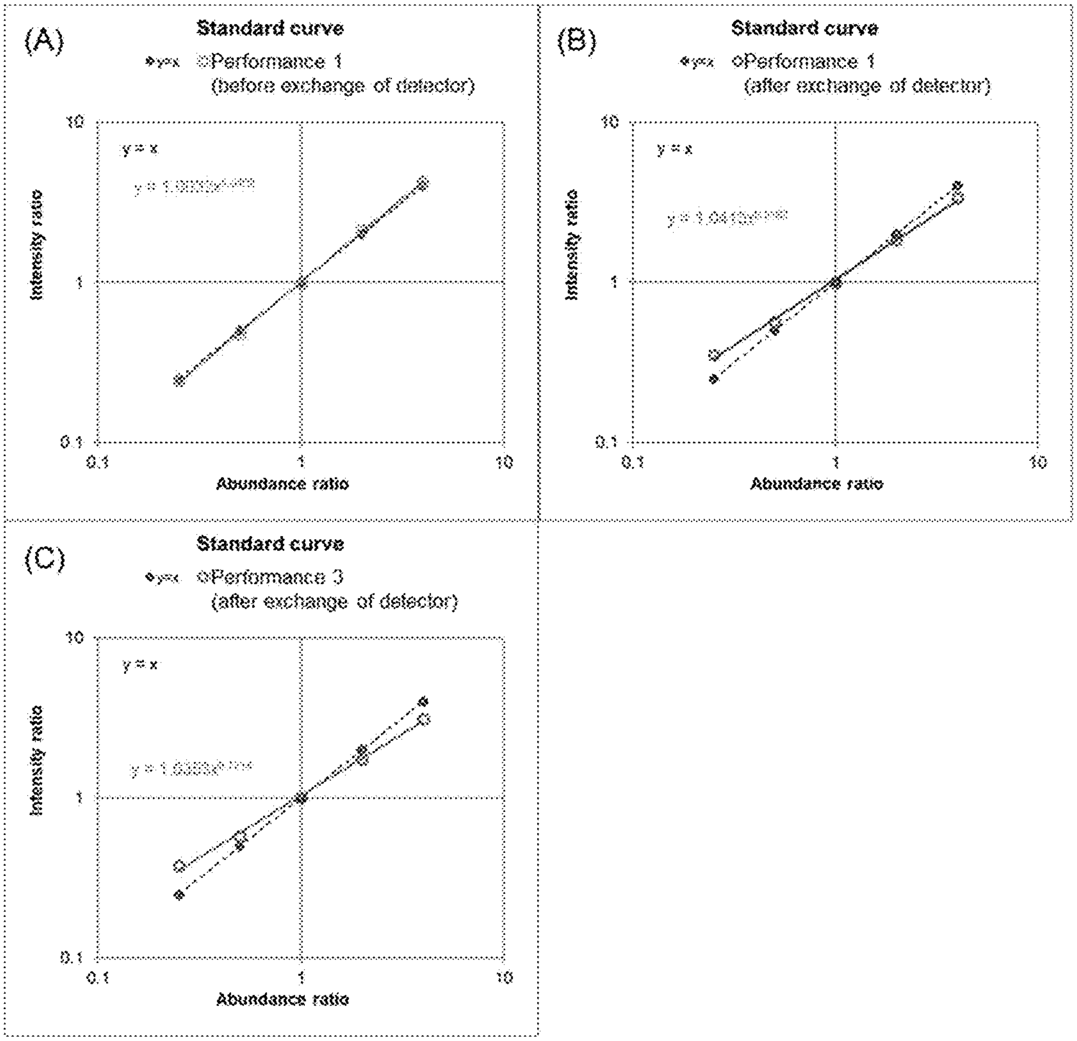

IC-1 to IC-5 were measured and obtained the peak intensity ratios under three conditions of before exchange of detector of Performance 1, after exchange of detector of Performance 1, and after exchange of detector of Performance 3. A power approximate equation was calculated by plotting the abundance ratio of Aβ1-38/SIL-Aβ1-38 on a horizontal axis and the peak intensity ratio of Aβ1-38/SIL-Aβ1-38 on a vertical axis.

Fig.11

(A)

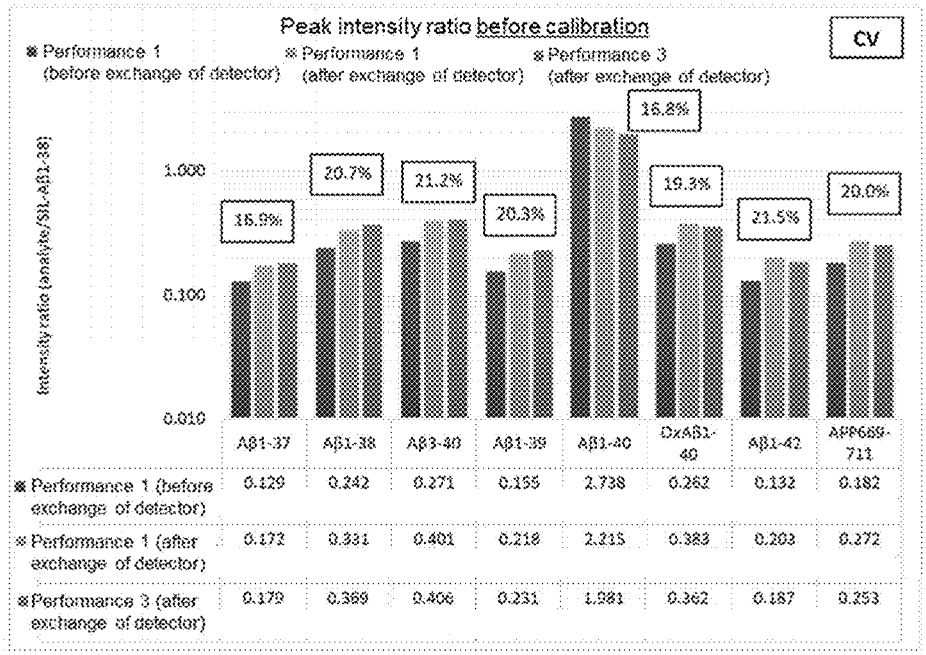

(B)

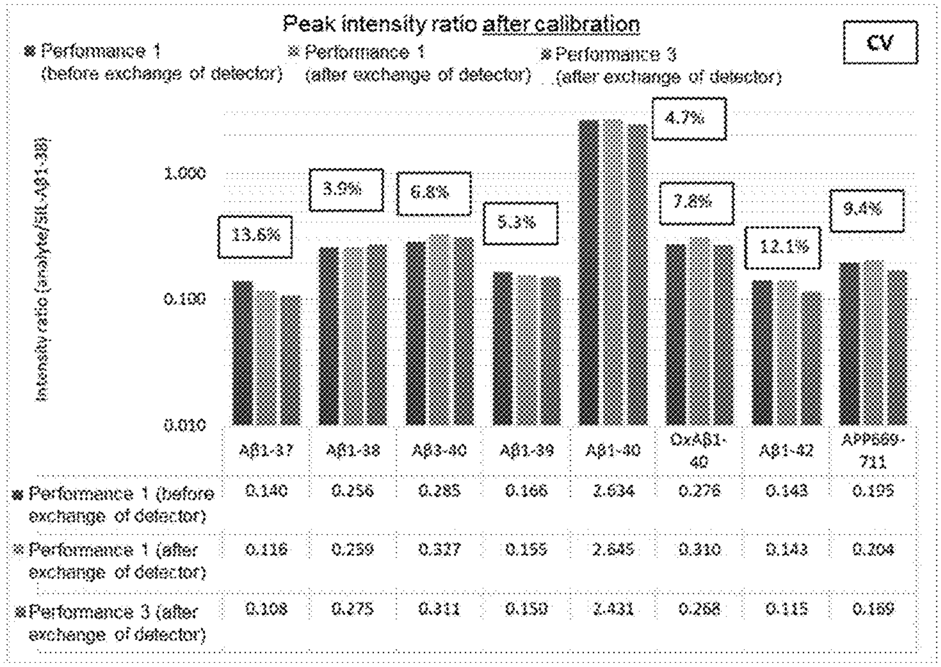

Fig. 11 shows the peak intensity ratios of Aβ and Aβ related peptides relative to SIL-Aβ1-38 obtained by IP-MS under three conditions of before exchange of detector of Performance 1, after exchange of detector of Performance 1, and after exchange of detector of Performance 3, wherein the peak intensity ratios before (A) and after (B) calibration using calibration formulas are shown. Calibration was performed by a method in which a value a was fixed to 1 and only a value b was adopted.

Fig.12

(A)

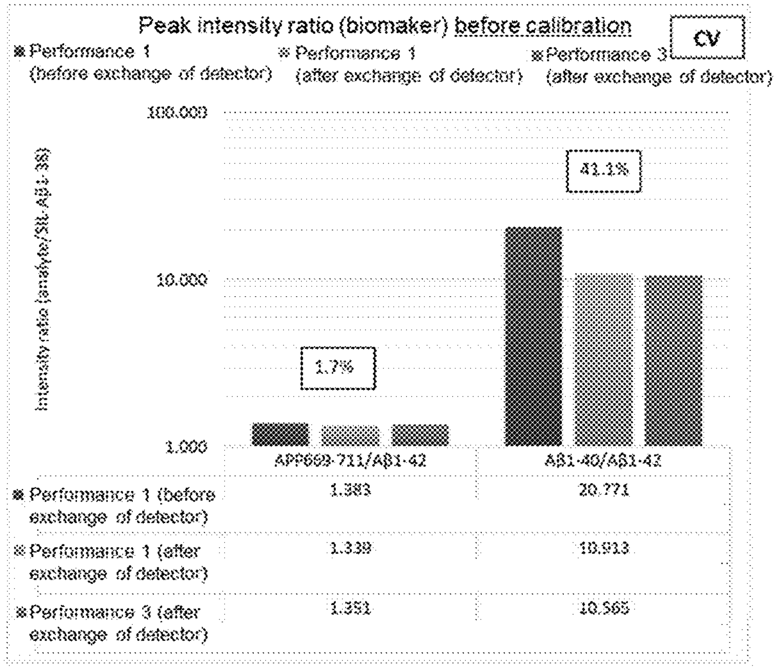

(B)

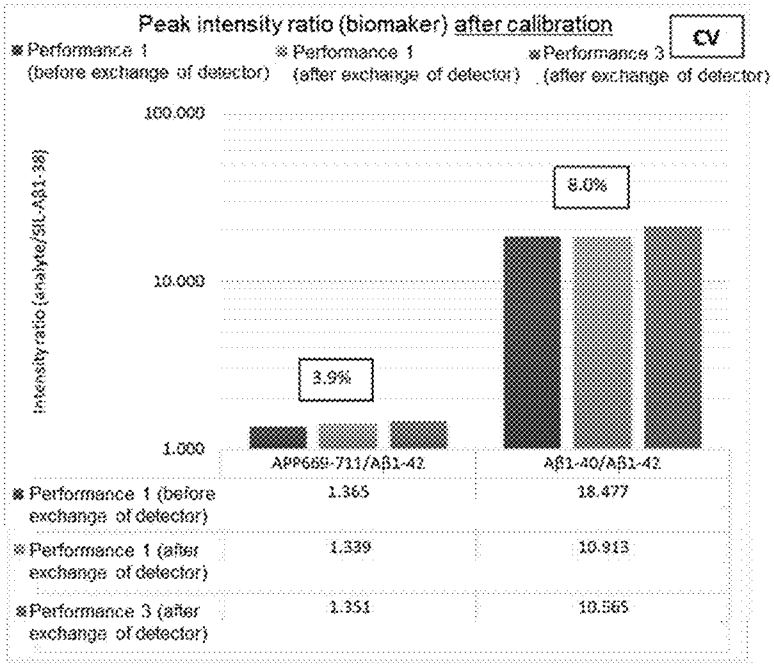

Fig. 12 shows the peak intensity ratios of biomarkers obtained by IP-MS under three conditions of before exchange of detector of Performance 1, after exchange of detector of Performance 1, and after exchange of detector of Performance 3, wherein the peak intensity ratios before (A) and after (B) calibration using calibration formulas. Calibration was performed by a method in which a value a was fixed to 1 and only a value b was adopted.

Fig.13

(A)

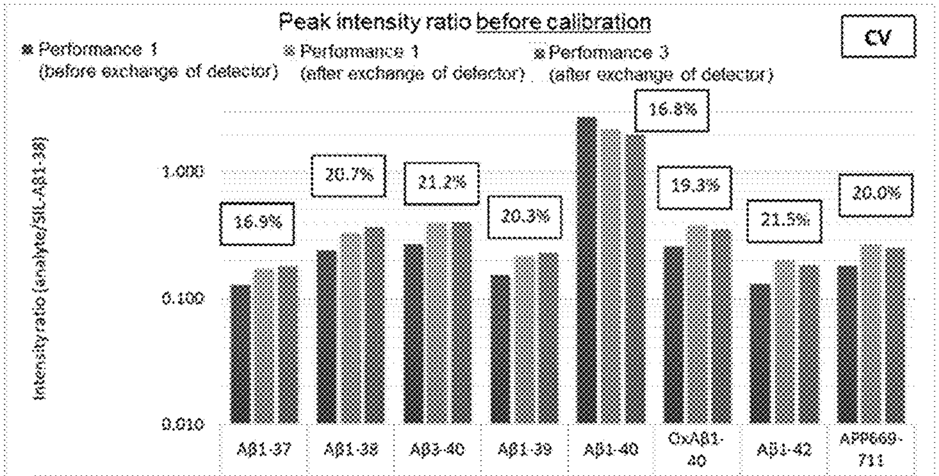

| | Aβ1-37 | Aβ1-38 | Aβ3-40 | Aβ1-39 | Aβ1-40 | OxAβ1-40 | Aβ1-42 | APP669-711 |
|---|---|---|---|---|---|---|---|---|
| ※ Performance 1 (before exchange of detector) | 0.129 | 0.242 | 0.271 | 0.155 | 2.738 | 0.262 | 0.132 | 0.182 |
| ※ Performance 1 (after exchange of detector) | 0.172 | 0.331 | 0.401 | 0.218 | 2.215 | 0.383 | 0.203 | 0.272 |
| ※ Performance 3 (after exchange of detector) | 0.179 | 0.369 | 0.406 | 0.231 | 1.981 | 0.362 | 0.187 | 0.253 |

(B)

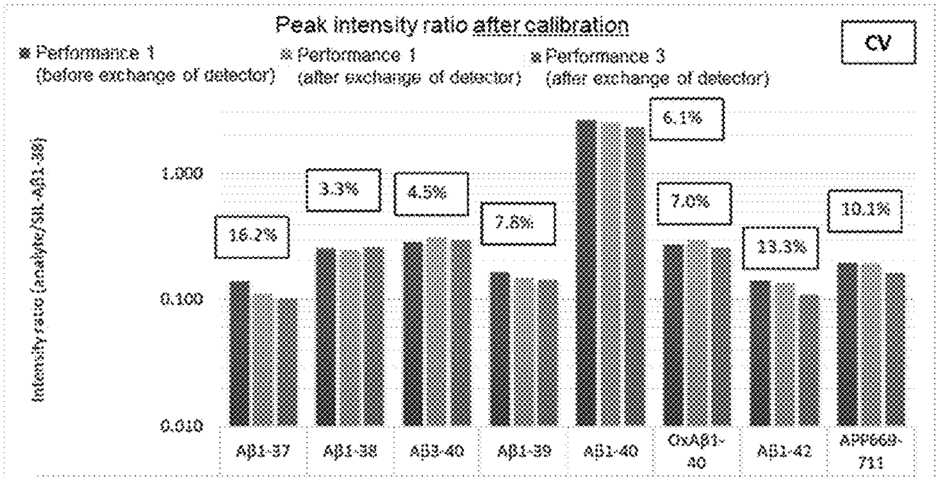

| | Aβ1-37 | Aβ1-38 | Aβ3-40 | Aβ1-39 | Aβ1-40 | OxAβ1-40 | Aβ1-42 | APP669-711 |
|---|---|---|---|---|---|---|---|---|
| ※ Performance 1 (before exchange of detector) | 0.140 | 0.255 | 0.284 | 0.166 | 2.625 | 0.275 | 0.142 | 0.194 |
| ※ Performance 1 (after exchange of detector) | 0.111 | 0.246 | 0.311 | 0.148 | 2.518 | 0.295 | 0.136 | 0.194 |
| ※ Performance 3 (after exchange of detector) | 0.103 | 0.263 | 0.297 | 0.143 | 2.324 | 0.256 | 0.110 | 0.162 |

Fig. 13 shows the peak intensity ratios of Aβ and Aβ related peptides relative to SIL-Aβ1-38 obtained by IP-MS under three conditions of before exchange of detector of Performance 1, after exchange of detector of Performance 1, and after exchange of detector of Performance 3, wherein the peak intensity ratios before (A) and after (B) calibration using calibration formulas. Calibration was performed by a method in which a value a and a value b were adopted.

Fig.14

(A)

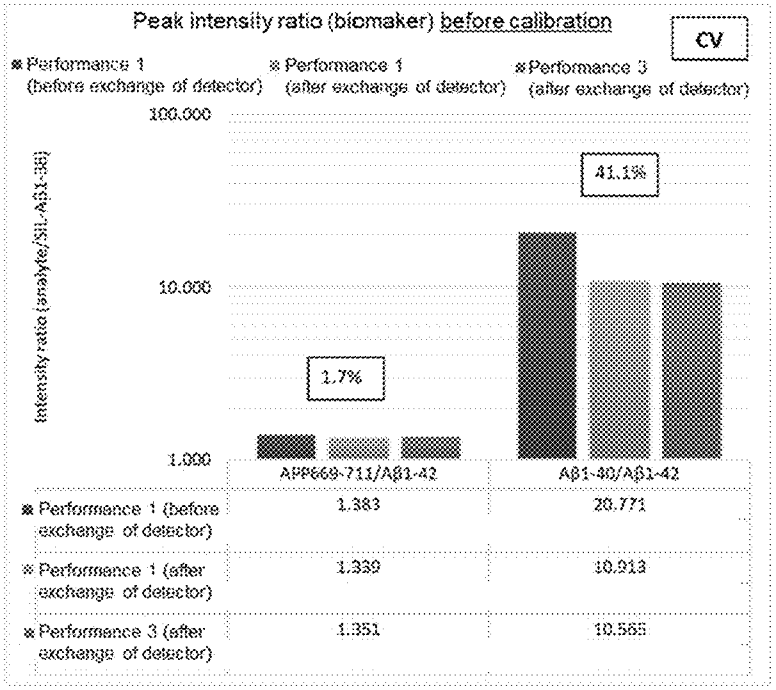

(B)

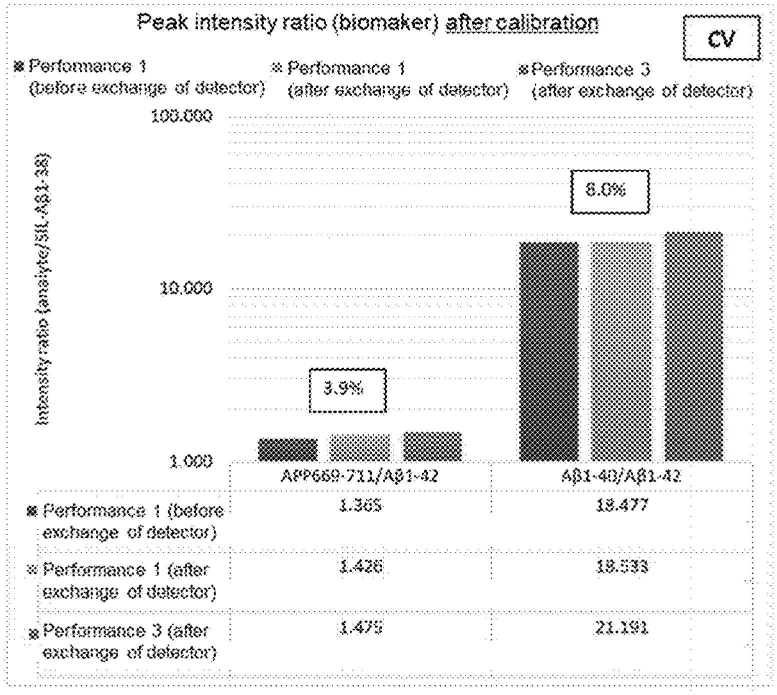

Fig. 14 shows the peak intensity ratios of biomarkers obtained by IP-MS under three conditions of before exchange of detector of Performance 1, after exchange of detector of Performance 1, and after exchange of detector of Performance 3, wherein the peak intensity ratios before (A) and after (B) calibration using calibration formulas. Calibration was performed by a method in which a value a and a value b were adopted.

A comparison of the ratios of Aβ1-40/Aβ1-42 between before and after calibration using the value b.

Error bars are standard deviations of three-set measurement.

A comparison of the ratios of APP669-711/Aβ1-42 between before and after calibration using the value b.

Error bars are standard deviations of three-set measurement.

SEQUENCE LISTING

```
<160> NUMBER OF SEQ ID NOS: 10

<210> SEQ ID NO 1
<211> LENGTH: 33
<212> TYPE: PRT
<213> ORGANISM: Homo Sapiens

<400> SEQUENCE: 1

His Asp Ser Gly Tyr Glu Val His His Gln Lys Leu Val Phe Phe Ala
1               5                   10                  15

Glu Asp Val Gly Ser Asn Lys Gly Ala Ile Ile Gly Leu Met Val Gly
            20                  25                  30

Gly


<210> SEQ ID NO 2
<211> LENGTH: 33
<212> TYPE: PRT
<213> ORGANISM: Homo Sapiens

<400> SEQUENCE: 2

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly


<210> SEQ ID NO 3
<211> LENGTH: 35
<212> TYPE: PRT
<213> ORGANISM: Homo Sapiens

<400> SEQUENCE: 3

His Asp Ser Gly Tyr Glu Val His His Gln Lys Leu Val Phe Phe Ala
1               5                   10                  15

Glu Asp Val Gly Ser Asn Lys Gly Ala Ile Ile Gly Leu Met Val Gly
            20                  25                  30

Gly Val Val
        35


<210> SEQ ID NO 4
<211> LENGTH: 35
<212> TYPE: PRT
<213> ORGANISM: Homo Sapiens

<400> SEQUENCE: 4

Asp Ala Glu Phe Arg His Asp Ser Gly Tyr Glu Val His His Gln Lys
1               5                   10                  15
```

```
Leu Val Phe Phe Ala Glu Asp Val Gly Ser Asn Lys Gly Ala Ile Ile
            20                  25                  30

Gly Leu Met
        35


<210> SEQ ID NO 5
<211> LENGTH: 37
<212> TYPE: PRT
<213> ORGANISM: Homo Sapiens

<400> SEQUENCE: 5

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly
        35


<210> SEQ ID NO 6
<211> LENGTH: 38
<212> TYPE: PRT
<213> ORGANISM: Homo Sapiens

<400> SEQUENCE: 6

Glu Phe Arg His Asp Ser Gly Tyr Glu Val His His Gln Lys Leu Val
1               5                   10                  15

Phe Phe Ala Glu Asp Val Gly Ser Asn Lys Gly Ala Ile Ile Gly Leu
            20                  25                  30

Met Val Gly Gly Val Val
        35


<210> SEQ ID NO 7
<211> LENGTH: 40
<212> TYPE: PRT
<213> ORGANISM: Homo Sapiens

<400> SEQUENCE: 7

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
        35                  40


<210> SEQ ID NO 8
<211> LENGTH: 40
<212> TYPE: PRT
<213> ORGANISM: Homo Sapiens

<400> SEQUENCE: 8

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val
        35                  40


<210> SEQ ID NO 9
<211> LENGTH: 42
<212> TYPE: PRT
<213> ORGANISM: Homo Sapiens
```

-continued

```
<400> SEQUENCE: 9

Asp Ala Glu Phe Arg His Asp Ser Gly Tyr Glu Val His His Gln Lys
1               5                   10                  15

Leu Val Phe Phe Ala Glu Asp Val Gly Ser Asn Lys Gly Ala Ile Ile
            20                  25                  30

Gly Leu Met Val Gly Gly Val Val Ile Ala
        35                  40


<210> SEQ ID NO 10
<211> LENGTH: 43
<212> TYPE: PRT
<213> ORGANISM: Homo Sapiens

<400> SEQUENCE: 10

Val Lys Met Asp Ala Glu Phe Arg His Asp Ser Gly Tyr Glu Val His
1               5                   10                  15

His Gln Lys Leu Val Phe Phe Ala Glu Asp Val Gly Ser Asn Lys Gly
            20                  25                  30

Ala Ile Ile Gly Leu Met Val Gly Gly Val Val
        35                  40
```

MACHINE DIFFERENCE CORRECTION METHOD FOR MASS SPECTROMETRY APPARATUS

A computer readable text file, entitled "SequenceListing.txt," created on or about Feb. 28, 2023 with a file size of 29,897 bytes contains the sequence listing for this application and is hereby incorporated by reference in its entirety.

TECHNICAL FIELD

The present invention relates to a method using a peptide ratio obtained by mass spectrometry. The present invention relates to a machine difference correction method of a mass spectrometer and a machine difference correction system of a mass spectrometer.

BACKGROUND ART

When a comparative analysis of abundances of substances is performed using a mass spectrometer, a method using the intensity ratio of two signal peaks is most commonly used. For example, a certain amount of an internal standard substance is added to samples to be compared, the samples are optionally pretreated, and then subjected to mass spectrometry, and a comparison is made between the values of intensity ratio of the peak of an analyte to be measured relative to the peak of the internal standard substance (Non-Patent Documents 1, 2 and 3).

Examples of patent documents include WO 2015/178398 (US 2017/0184573), and WO 2017/047529 (US 2018/0238909).

In addition, a semi-quantitative comparative analysis can be performed by labeling a target substance derived from each of different samples with labeled compounds different in mass due to the use of a stable isotope element and calculating the intensity ratio of peaks of the target substance different in mass by mass spectrometry. This technique includes ICAT (registered trademark) and iTRAQ (registered trademark) used in the field of proteomics (Non-Patent Documents 4 and 5).

CITATION LIST

Patent Documents

Patent Document 1: WO 2015/178398
Patent Document 2: US 2017/0184573
Patent Document 3: WO 2017/047529
Patent Document 4: US 2018/0238909

Non-Patent Documents

Non-Patent Document 1: Kaneko N, Nakamura A, Washimi Y, Kato T, Sakurai T, Arahata Y, Bundo M, Takeda A, Niida S, Ito K, Toba K, Tanaka K, Yanagisawa K.: Novel plasma biomarker surrogating cerebral amyloid deposition. Proc Jpn Acad Ser B Phys Biol Sci. 2014; 90 (9): 353-364.

Non-Patent Document 2: Nakamura A, Kaneko N, Villemagne V L, Kato T, Doecke J, Doré V, Fowler C, Li Q X, Martins R, Rowe C, Tomita T, Matsuzaki K, Ishii K, Ishii K, Arahata Y, Iwamoto S, Ito K, Tanaka K, Masters C L, Yanagisawa K.: High performance plasma amyloid-β biomarkers for Alzheimer's disease. Nature. 2018; 554 (7691): 249-254.

Non-Patent Document 3: Nicol G R, Han M, Kim J, Birse C E, Brand E, Nguyen A, Mesri M, FitzHugh W, Kaminker P, Moore P A, Ruben S M, He T: Use of an immunoaffinity-mass spectrometry-based approach for the quantification of protein biomarkers from serum samples of lung cancer patients. Mol Cell Proteomics. 2008 October; 7 (10): 1974-82.

Non-Patent Document 4: Han D K, Eng J, Zhou H, Aebersold R: Quantitative profiling of differentiationinduced microsomal proteins using isotope-coded affinity tags and mass spectrometry. Nat Biotechnol. 2001 October; 19 (10): 946-51.

Non-Patent Document 5: Ross P L, Huang Y N, Marchese J N, Williamson B, Parker K, Hattan S, Khainovski N, Pillai S, Dey S, Daniels S, Purkayastha S, Juhasz P, Martin S, Bartlet-Jones M, He F, Jacobson A, Pappin D J: Multiplexed protein quantitation in Saccharomyces cerevisiae using amine-reactive isobaric tagging reagents. Mol Cell Proteomics. 2004 December; 3 (12): 1154-69.

SUMMARY OF THE INVENTION

Problems to be Solved by the Invention

When very small amounts of substances are measured using a mass spectrometer, it is confirmed that a phenomenon occurs in which even when machines of the same type are used, a detected peak intensity ratio varies between the machines. One of means for calibrating such a difference in peak intensity ratio between different machines is the following absolute quantitation method.

A standard product of an analyte substance to be quantitated and a substance used as a reference for measuring an intensity ratio (as a reference substance, a labeled substance of the analyte substance with a stable isotope is generally used) are prepared. Samples containing the reference substance at a certain concentration and the standard product at different concentrations are measured to prepare a calibration curve of the peak intensity ratio of the standard product relative to the reference substance. The absolute quantitation of the analyte substance can be performed using this calibration curve. Therefore, even when there is a difference in peak intensity ratio between different machines, an unknown analyte substance present in a biological sample can be quantitated without the influence of such a difference by preparing a calibration curve for every machine and every measurement.

However, this method using a calibration curve requires a standard product. When a standard product cannot easily be synthesized, or when the kinds of analyte substances are very many and therefore it is difficult to prepare the standard products of all the analyte substances and control quality thereof in terms of time and cost, or when a standard product is unstable, a calibration curve cannot be prepared. As described above, the peak intensity ratio varies between different mass spectrometer machines. Therefore, when a calibration curve cannot be prepared, samples to be compared need to be measured by one machine. However, it is difficult to obtain consistent data because a detector deteriorates due to the use of the machine so that the peak intensity ratio varies.

In mass spectrometry, a sample is ionized by laser irradiation. Therefore, data is influenced by the conditions of a laser of a mass spectrometer (deterioration with, for example, an increase in the number of uses). Therefore, when the same sample is measured by different machines, there is not a little difference in data between the machines. Therefore, the data lacks in stability.

It is an object of the present invention to provide a method for collecting a difference in mass spectrometry data between mass spectrometer machines, and a system for collecting a difference between mass spectrometer machines.

Means for Solving the Problems

The present invention includes the following aspect.

A method for calibrating a difference in signal intensity ratio between machines in mass spectrometry, the method comprising the steps of:

- measuring a calibrant containing not less than two calibration substances by a mass spectrometer to obtain a signal peak of each of the calibration substances;
- determining a signal peak intensity ratio of, relative to a signal peak intensity of one calibration substance of the not less than two calibration substances, a signal peak intensity of another calibration substance;
- determining a calibration formula from the signal peak intensity ratio;
- measuring a sample containing not less than two analyte substances by the mass spectrometer to obtain a signal peak of each of the analyte substances;
- determining a signal peak intensity ratio of, relative to a signal peak intensity of one analyte substance of the not less than two analyte substances, a signal peak intensity of another analyte substance; and
- calibrating the signal peak intensity ratio of the analyte substances using the calibration formula.

The present invention also includes the following aspect.

A machine difference calibration system of a mass spectrometer, the system comprising:

- a measuring method preparing unit for preparing a measuring method for measuring a calibrant for calculating a calibration value in a mass spectrometer; and
- a calibration value calculating unit for calculating a calibration value by analysis of mass spectrometry data obtained using the measuring method.

Effects of the Invention

According to the present invention, a peak intensity ratio of analyte substances can be calibrated using a calibration formula determined from measurement results of calibration substances. Therefore, even when the same sample is measured by different machines respectively, an equivalent peak intensity ratio of the analyte substances can be obtained.

BRIEF DESCRIPTION OF THE DRAWINGS

FIG. 1 shows the results of measurement of Aβ and Aβ related peptides by three mass spectrometers (Performance 1, Performance 2, and Performance 3) after immunoprecipitation (IP) of a blood plasma sample (Sample No. 1) spiked with an internal standard peptide (SIL-Aβ1-38), wherein a vertical axis in FIG. 1(A) represents the peak intensity ratio of each of the Aβ and Aβ related peptides relative to SIL-Aβ1-38; and a vertical axis in FIG. 1(B) represents the peak intensity ratio of each of the Aβ, Aβ related peptides, and SIL-Aβ1-38 relative to APP669-711.

FIG. 3 is a diagram in which a vertical axis represents a value obtained by logarithmic transformation of each peak intensity ratio measured by Performance 1 (standard machine) after IP of the blood plasma sample (Sample No. 1), a horizontal axis represents a value obtained by logarithmic transformation of each peak intensity ratio determined by measurement of the same sample by Performance 2 or 3, and a linear regression equation of the measured values of Performance 2 or 3 with respect to the measured values of Performance 1 (standard machine) and a coefficient of determination ($R^2$) are shown.

FIG. 4 is a diagram in which a vertical axis represents each peak intensity ratio measured by Performance 1 (standard machine) after IP of the blood plasma sample (Sample No. 1), a horizontal axis represents each peak intensity ratio determined by measurement of the same sample by Performance 2 or 3, and a power approximate equation of the measured values of Performance 2 or 3 with respect to the measured values of Performance 1 (standard machine) and a coefficient of determination ($R^2$) are shown.

FIG. 5 shows values obtained by calibrating the peak intensity ratios of the Aβ and Aβ related peptides relative to the internal standard peptide (SIL-Aβ1-38) measured by Performance 2 and Performance 3 using calibration formulas to be equivalent to the peak intensity ratios measured by Performance 1 (standard machine), wherein Performance 2 (Cal.) and Performance 3 (Cal.) mean such calibrated values, a vertical axis represents the peak intensity ratio of each of the Aβ and Aβ related peptides relative to SIL-Aβ1-38, and numerical values (%) are coefficients of variation (CVs) of the peak intensity ratios of Performance 1 (standard machine). Performance 2 (Cal.), and Performance 3 (Cal.).

FIG. 6 shows the peak intensity ratios of Aβ and Aβ related peptides relative to SIL-Aβ1-38 measured by Performance 1, Performance 2, and Performance 3 after IP of a blood plasma sample (Sample No. 2), wherein FIG. 6(A) shows the peak intensity ratios of the Aβ and Aβ related peptides relative to SIL-Aβ1-38 measured by Performance 2 and Performance 3 before calibration using calibration formulas, FIG. 6(B) shows peak intensity ratios after calibration, Performance 2 (Cal.) and Performance 3 (Cal.) mean such calibrated values, and numerical values (%) in FIG. 6(A) and FIG. 6(B) are coefficients of variation (CVs) of the peak intensity ratios of Performance 1 (standard machine), Performance 2 (Cal.), and Performance 3 (Cal.).

FIG. 7 shows the peak intensity ratios of Aβ and Aβ related peptides relative to SIL-Aβ1-38 measured by Performance 1, Performance 2, and Performance 3 after IP of a blood plasma sample (Sample No. 3), wherein FIG. 7(A) shows the peak intensity ratios of the Aβ and Aβ related peptides relative to SIL-Aβ1-38 measured by Performance 2 and Performance 3 before calibration using calibration formulas, FIG. 7(B) shows peak intensity ratios after calibration, Performance 2 (Cal.) and Performance 3 (Cal.) mean such calibrated values, and numerical values (%) in FIG. 7(A) and FIG. 7(B) are coefficients of variation (CVs) of the peak intensity ratios of Performance 1 (standard machine), Performance 2 (Cal.), and Performance 3 (Cal.).

FIG. 8 shows the results of IP-MS of the blood plasma sample (Sample No. 1) performed in different two days (Day 1 and Day 2), wherein a vertical axis represents a value obtained by logarithmic transformation of each peak intensity ratio measured by Performance 1 (standard machine) in each day, a horizontal axis represents a value obtained by logarithmic transformation of each peak intensity ratio measured by Performance 2, and a linear regression equation of the measured values of Performance 2 with respect to the measured values of Performance 1 and a coefficient of determination ($R^2$) are shown.

FIG. 9 shows the results of IP-MS of the blood plasma sample (Sample No. 1) performed in different two days (Day 1 and Day 2), wherein a vertical axis represents a value obtained by logarithmic transformation of each peak intensity ratio measured by Performance 1 (standard machine) in each day, a horizontal axis represents a value obtained by logarithmic transformation of each peak intensity ratio measured by Performance 3, and a linear regression equation of the measured values of Performance 3 with respect to the measured values of Performance 1 and a coefficient of determination ($R^2$) are shown.

FIG. 10 shows the measurement results of IC-1 to IC-5 under three conditions of before exchange of detector of Performance 1, after exchange of detector of Performance 1, and after exchange of detector of Performance 3, wherein a horizontal axis represents the abundance ratio of Aβ1-38/SIL-Aβ1-38, a vertical axis represents the peak intensity ratio of Aβ1-38/SIL-Aβ1-38, a power approximate equation is shown in each diagram, FIG. 10(A) shows the result of Performance 1 (before exchange of a detector), FIG. 10(B) shows the result of Performance 1 (after exchange of a detector), and FIG. 10(C) shows the result of Performance 3.

FIG. 11 shows the peak intensity ratios of Aβ and Aβ related peptides relative to SIL-Aβ1-38 obtained by IP-MS under three conditions of before exchange of detector of Performance 1, after exchange of detector of Performance 1, and after exchange of detector of Performance 3, wherein FIG. 11(A) shows the peak intensity ratios of the Aβ and Aβ related peptides relative to SIL-Aβ1-38 before calibration using calibration formulas, FIG. 11(B) shows peak intensity ratios after calibration, and calibration was performed by a method in which a value a was fixed to 1 (a=1) and only a value b was used.

FIG. 12 shows the peak intensity ratios of biomarkers, that is, the peak intensity ratios of APP669-711/Aβ1-42 and Aβ1-40/Aβ1-42 obtained by IP-MS under three conditions of before exchange of detector of Performance 1, after exchange of detector of Performance 1, and after exchange of detector of Performance 3, wherein FIG. 12(A) shows the peak intensity ratios of the biomarkers before calibration using calibration formulas, FIG. 12(B) shows peak intensity ratios after calibration, and calibration was performed by a method in which a value a was fixed to 1 (a=1) and only a value b was used.

FIG. 13 shows the peak intensity ratios of Aβ and Aβ related peptides relative to SIL-Aβ1-38 obtained by IP-MS under three conditions of before exchange of detector of Performance 1, after exchange of detector of Performance 1, and after exchange of detector of Performance 3, wherein FIG. 13(A) shows the peak intensity ratios of the Aβ and Aβ related peptides relative to SIL-Aβ1-38 before calibration using calibration formulas, FIG. 13(B) shows peak intensity ratios after calibration, and calibration was performed by a method in which a value a and a value b were used.

FIG. 14 shows the peak intensity ratios of biomarkers, that is, the peak intensity ratios of APP669-711/Aβ1-42 and Aβ1-40/Aβ1-42 obtained by IP-MS under three conditions of before exchange of detector of Performance 1, after exchange of detector of Performance 1, and after exchange of detector of Performance 3, wherein FIG. 14(A) shows peak intensity ratios before calibration using calibration formulas, FIG. 14(B) shows peak intensity ratios after calibration, and calibration was performed by a method in which a value a and a value b were used.

MODES FOR CARRYING OUT THE INVENTION

Figure 2:
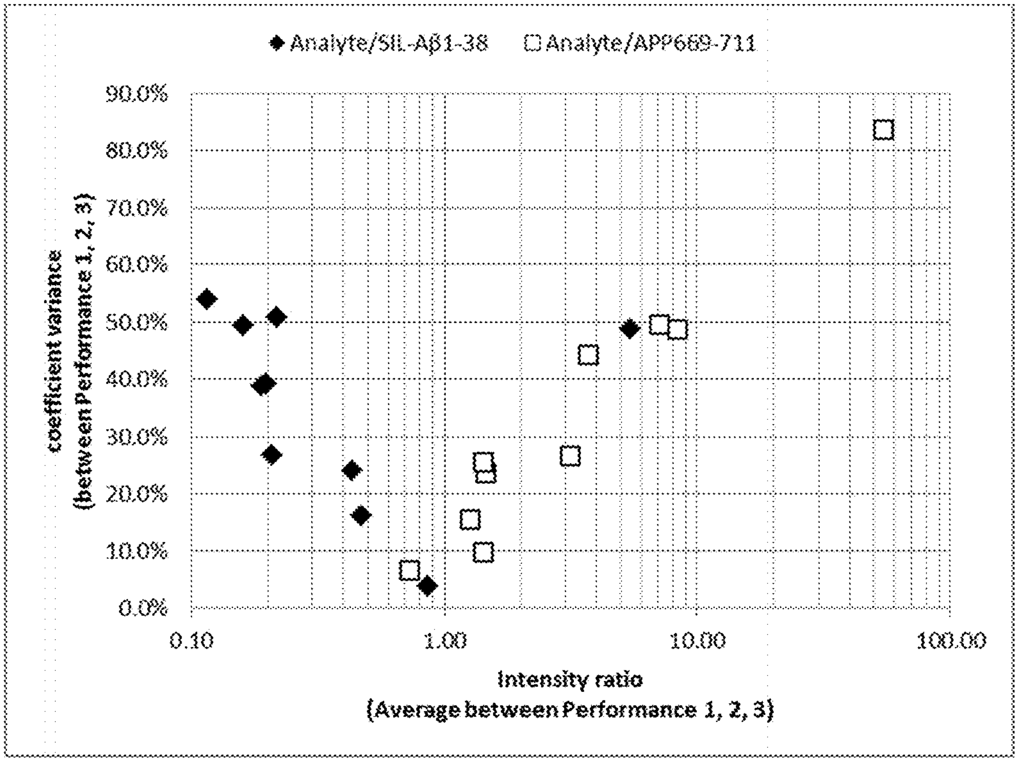
FIG. 2 is a diagram in which a vertical axis represents a coefficient of variation (CV) of the peak intensity ratios measured by the three mass spectrometers (Performance 1, Performance 2, and Performance 3) after IP of the blood plasma sample (Sample No. 1), and a horizontal axis represents the average of the peak intensity ratios measured by the three mass spectrometers.

An embodiment of a method according to the present invention is a method for calibrating a difference in signal intensity ratio between machines in mass spectrometry, the method comprising the steps of:

- measuring a calibrant containing not less than two calibration substances by a mass spectrometer to obtain a signal peak of each of the calibration substances;
- determining a signal peak intensity ratio of, relative to a signal peak intensity of one calibration substance of the not less than two calibration substances, a signal peak intensity of another calibration substance;
- determining a calibration formula from the signal peak intensity ratio;
- measuring a sample containing not less than two analyte substances by the mass spectrometer to obtain a signal peak of each of the analyte substances;
- determining a signal peak intensity ratio of, relative to a signal peak intensity of one analyte substance of the not less than two analyte substances, a signal peak intensity of another analyte substance; and
- calibrating the signal peak intensity ratio of the analyte substances using the calibration formula.

This embodiment will be described in detail below. It should be noted that in Examples that will be described later, more specific examples will be shown with reference to FIGS. 1 to 19.

[1. Analyte Substances]

The analyte substances to be analyzed are not particularly limited, and examples thereof include peptides, glycopeptides, sugar chains, proteins, lipids, and glycolipids. The peptides, glycopeptides, sugar chains, proteins, lipids, and glycolipids include those of various kinds. More specifically, the analyte substances may be Aβ and an Aβ related peptide. The "Aβ and an Aβ related peptide" may simply collectively be called "Aβ related peptides". The "Aβ and an Aβ related peptide" includes Aβ generated by cleaving amyloid precursor protein (APP) and peptides containing even part of the sequence of Aβ. In Examples, examples using Aβ and Aβ related peptides are shown.

Also, the peptides may be those obtained by immunoprecipitation (IP). Alternatively, the peptides may be those generated by digestion of protein with an enzyme such as peptidase, or those fractionated by chromatography.

The analyte substances may include an internal standard substance. The internal standard substance may appropriately be selected by those skilled in the art. For example, a substance labeled with a stable isotope may be used. One substance of the analyte substances may be labeled with a stable isotope. In Examples, examples using stable isotope-labeled Aβ1-38 (SIL-Aβ1-38) as an internal standard substance are shown. SIL is an abbreviation for stable isotope-labeled.

A sample containing the analyte substances is subjected to mass spectrometry. The sample to be subjected to mass spectrometry is not particularly limited, and may be, for example, a living body-derived sample. The living body-derived sample includes body fluids such as blood, cerebrospinal fluid (CSF), urine, body secreting fluid, saliva, and sputum; and feces. The blood sample includes whole blood, plasma, serum and the like. The blood sample can be prepared by appropriately treating whole blood collected from an individual. The treatment performed in the case of preparing a blood sample from collected whole blood is not particularly limited, and any treatment that is clinically acceptable may be performed. For example, centrifugal separation or the like may be performed. The blood sample to be subjected to mass spectrometry may be appropriately stored at a low temperature such as freezing in the intermediate stage of the preparation step or in the post stage of the preparation step. In the present invention, when the living body-derived sample such as a blood sample is subjected to mass spectrometry, the living body-derived sample is disposed of rather than being returned to the individual subject from which it is derived.

The sample to be subjected to mass spectrometry may be one that has been subjected to various pretreatments. For example, the sample may be one that has been subjected to immunoprecipitation (IP). The sample may be one that has been subjected to protein digestion with an enzyme such as peptidase. The sample may be one that has been subjected to chromatography. The sample to be subjected to mass spectrometry may be one to which a certain amount of an internal standard substance has been added.

In this embodiment, an eluate obtained by immunoprecipitation previously performed may be subjected to mass spectrometry (Immunoprecipitation-mass spectrometry; IP-MS). The immunoprecipitation may be performed using an antibody-immobilized carrier prepared using immunoglobulin having an antigen-binding site that can recognize an analyte substance or an immunoglobulin fraction containing an antigen-binding site that can recognize an analyte substance.

In this embodiment, consecutive immunoprecipitation (cIP) may be conducted, and then a peptide in the sample may be detected by a mass spectrometer (cIP-MS). By conducting affinity purification twice consecutively, impurities that cannot be excluded by one affinity purification can be further reduced by the second affinity purification. Therefore, it is possible to prevent the ionization suppression of polypeptide due to impurities, and it becomes possible to measure even a very small amount of polypeptide in a living body sample with high sensitivity by mass spectrometry.

[2. Mass Spectrometry]

The mass spectrometry is not particularly limited, and examples thereof include those for mass spectrometry such as matrix-assisted laser desorption/ionization (MALDI) mass spectrometry or electrospray ionization (ESI) mass spectrometry. For example, a MALDI-TOF (matrix-assisted laser desorption/ionization time-of-flight) mass spectrometer, a MALDI-IT (matrix-assisted laser desorption/ionization ion trap) mass spectrometer, a MALDI-IT-TOF (matrix-assisted laser desorption/ionization ion trap time-of-flight) mass spectrometer, a MALDI-FTICR (matrix-assisted laser desorption/ionization Fourier transform ion cyclotron resonance) mass spectrometer, an ESI-QqQ (electrospray ionization triple quadrupole) mass spectrometer, an ESI-Qq-TOF (electrospray ionization tandem quadrupole time-of-flight) mass spectrometer, or an ESI-FTICR (electrospray ionization Fourier transform ion cyclotron resonance) mass spectrometer or the like can be used.

A matrix and a matrix solvent can be appropriately determined by a person skilled in the art depending on the analyte substance.

As the matrix, for example, α-cyano-4-hydroxycinnamic acid (CHCA), 2,5-dihydroxybenzoic acid (2,5-DHB), sinapic acid, 3-aminoquinoline (3-AQ) or the like can be used.

The matrix solvent can be selected from the group consisting of, for example, acetonitrile (ACN), trifluoroacetic acid (TFA), methanol, ethanol and water, and used. More specifically, an ACN-TFA aqueous solution, an ACN aqueous solution, methanol-TFA aqueous solution, a methanol aqueous solution, an ethanol-TFA aqueous solution, an ethanol solution or the like can be used. The concentration of ACN in the ACN-TFA aqueous solution can be, for example, 10 to 90% by volume, the concentration of TFA can be, for example, 0.05 to 1% by volume, preferably 0.05 to 0.1% by volume.

The matrix concentration can be, for example, 0.1 to 50 mg/mL, preferably 0.1 to 20 mg/mL, or 0.3 to 20 mg/mL, further preferably 0.5 to 10 mg/mL.

In the case of employing MALDI mass spectrometry as a detecting system, a matrix additive (comatrix) is preferably used together. The matrix additive can be appropriately selected by a person skilled in the art depending on the analysis subject (poly peptides) and/or the matrix. For example, as the matrix additive, a phosphonic acid group-containing compound can be used. Specific examples of a compound containing one phosphonic acid group include phosphonic acid, methylphosphonic acid, phenylphosphonic acid, 1-naphthylmethylphosphonic acid, and the like. Specific examples of a compound containing two or more phosphonic acid groups include methylenediphosphonic acid (MDPNA), ethylenediphosphonic acid, ethane-1-hydroxy-1,1-diphosphonic acid, nitrilotriphosphonic acid, ethylenediaminetetraphosphonic acid, and the like. Among the aforementioned phosphonic acid group-containing compounds, compounds having two or more, preferably two to four phosphonic acid groups in one molecule are preferred.

The use of the phosphonic acid group-containing compound is useful, for example, when metal ions of the washing solution remaining on the surface of the antibody-immobilizing carrier are contaminated into the eluate after the dissociating step. The metal ions adversely affect on the background in the mass spectrometry. The use of the phosphonic acid group-containing compound is effective for suppressing such an adverse affect.

Besides the aforementioned matrix additive, a more common additive, for example, a substance that is selected from the group consisting of ammonium salts and organic bases may be used.

The matrix additive can be prepared as a solution of 0.1 to 10 w/v %, preferably 0.2 to 4 w/v % in water or in a matrix solvent. The matrix additive solution and the matrix solution can be mixed in a volume ratio of, for example, 1:100 to 100:1, preferably 1:10 to 10:1.

[3. Calibration Substances]

In this embodiment, not less than two calibration substances are measured by a mass spectrometer. A calibration formula for the mass spectrometer is calculated using the measurement results of the calibration substances.

The calibration substances may appropriately be determined by those skilled in the art. For example, analyte substances per se may be used or substances different from analyte substances may be used. Stable isotope-labeled substances may be used. A substance labeled with a stable isotope and a substance not labeled with a stable isotope may be used. The calibration substances may be Aβ and an Aβ related peptide(s). When analyte substances are Aβ and an Aβ-related peptide(s), for example, stable isotope-labeled Aβ1-38 (SIL-Aβ1-38) may be used as one of the calibration substances.

The calibration substances may include a compound and said compound labeled with a stable isotope. In mass spectrometry, a compound is ionized for detection. The efficiency of ionization differs depending on the kind of compound, and such a difference in ionization efficiency has an influence on the measurement result of mass spectrometry. A certain compound and said compound labeled with a stable isotope are the same in ionization efficiency. Therefore, a calibration formula with higher accuracy can be obtained using them as calibration substances. For example, in Example 2, Aβ1-38 and stable isotope-labeled Aβ1-38 (SIL-Aβ1-38) are used as calibration substances.

[4. Calibrant]

A calibrant is a solution containing a calibration substance. In this embodiment, as a calibrant, a solution containing not less than two calibration substances is used.

As the calibrant, for example, a sample per se containing analyte substances may be used. Alternatively, the calibrant may be one obtained by adding calibration substances to a sample per se containing analyte substances. A solution containing not less than two calibration substances may be prepared and used separately from a sample per se containing analyte substances.

A calibration formula for the mass spectrometer is calculated using the measurement result of the solution containing not less than two calibration substances. In order to calculate a calibration formula, two or more pieces of data are required. For example, when a calibration formula is calculated using a signal peak intensity ratio, two or more pieces of data different in signal peak intensity ratio are required.

For example, when a calibration formula is calculated using one calibrant, the calibrant needs to contain at least three kinds of calibration substances. The ratio of, relative to the signal peak intensity of one of the calibration substances, the signal peak intensity of each of the other not less than two calibration substances may be calculated to obtain not less than two signal peak intensity ratios.

For example, when calibration substances are represented as C1, C2, and C3, C2/C1 and C3/C1 are calculated as peak intensity ratios using C1 as a reference.

Alternatively, two or more calibrants may be used which are different in the concentrations of calibration substances whose signal peak intensity ratio should be determined. In this case, at least two kinds of calibration substances need to be used. The ratio of, relative to the signal peak intensity of one of the calibration substances, the signal peak intensity of the other calibration substance may be calculated for each of the calibrants to obtain not less than two signal peak intensity ratios.

For example, when calibration substances are represented as C1 and C2, the peak intensity ratio of C2/C1 is calculated for each of calibrants different in concentration.

Two or more calibrants may be used which contain one calibration substance at a certain concentration and another calibration substance at different concentrations. The concentration ratios between the calibration substances, whose signal peak intensity ratio should be determined, of the two or more calibrants may be, for example, in the range of ¼ to 4. For example, five kinds of calibrant solutions whose calibration substance concentration ratios are adjusted to ¼, ½, 1, 2, and 4 may be used.

[5. Calibration of Measurement Results in Mass Spectrometer]

In this embodiment, the measurement results of not less than two calibration substances by a mass spectrometer are used to calculate a calibration formula for the mass spectrometer. Then, the measurement results of analyte substances are calibrated using the calculated calibration formula. The calibration method according to the present invention includes a calibration method using a calibration formula calculated using a standard machine. Further, the calibration method according to the present invention includes a method in which the measurement results of mass spectrometry are standardized using calibration substances whose abundances are known.

The calibration formula is calculated for every mass spectrometer. Even in the case of the same mass spectrometer, a new calibration formula is preferably calculated when a part such as a detector or the like is exchanged or when the setting of the machine, such as a detector voltage or the like, is changed. Alternatively, the calibration formula may regularly be calculated. This makes it possible to detect the deterioration or failure of a detector or the like of the mass spectrometer or to obtain measurement results from which the influence thereof has been removed. Therefore, it is possible to perform a comparative evaluation of abundance ratios of analyte substances between two or more samples with high accuracy irrespective of a difference between mass spectrometer machines or the machine conditions of the mass spectrometer.

More preferably, when analyte substances are measured, a calibration formula is calculated by measuring calibration substances under the same machine conditions as the measurement of the analyte substances. This makes it possible to use a calibration formula determined under the same conditions as the measurement of the analyte substances and therefore to further improve the accuracy of calibration. Therefore, it is possible to perform a comparative evaluation of abundance ratios of analyte substances between two or more samples with higher accuracy irrespective of a difference between mass spectrometer machines or the machine conditions of a mass spectrometer.

[5-1. Calibration Using Calibration Formula Using Standard Machine]

[5-1-1. Calculation of Calibration Formula]

A calibrant solution containing not less than two calibration substances is measured by a standard machine to obtain a signal peak intensity of each of the calibration substances. The ratio of, relative to the signal peak intensity of one of the calibration substances, the signal peak intensity of each of the one or more other calibration substances is calculated.

As the standard machine, a mass spectrometer having high reliability is preferably used. Each user can freely set a mass spectrometer that should be used as a standard machine.

The calibrant solution containing not less than two calibration substances is measured by a mass spectrometer, for which a calibration formula should be calculated, to obtain a signal peak intensity of each of the calibration substances. The ratio of, relative to the signal peak intensity of one of the calibration substances, the signal peak intensity of each of the one or more other calibration substances is calculated.

A regression equation is calculated between the signal peak intensity ratio calculated by the standard machine and the signal peak intensity ratio calculated by the mass spectrometer for which a calibration formula should be calculated. The calculation of a regression equation may appropriately be performed using a known method such as a least-square method or the like. The calculation of a regression equation may be performed using the logarithms of the signal peak intensity ratios. The regression equation may appropriately be selected from among a linear regression equation, a multiple regression equation, an exponential regression equation, a logarithmic regression equation, and a power regression equation.

For example, a linear regression equation may be calculated using values obtained by logarithmic transformation of the signal peak intensity ratios. Alternatively, for example, a power regression equation may be calculated using the signal peak intensity ratios. The calculated regression equation is defined as a calibration formula for the said mass spectrometer.

For example, when the logarithm of the signal peak intensity ratio calculated by the mass spectrometer for which a calibration formula should be calculated is defined as x, and the logarithm of the signal peak intensity ratio calculated by the standard machine is defined as y, calibration coefficients a and b of:

a linear regression equation ($y=ax+b$)

can be calculated. The calculated linear regression equation ($y=ax+b$) can be used as a calibration formula for the said mass spectrometer.

Alternatively, when the signal peak intensity ratio calculated by the mass spectrometer for which a calibration formula should be calculated is defined as x, and the signal peak intensity ratio calculated by the standard machine is defined as y, calibration coefficients a and b of:

a power regression equation ($y=ax^b$)

may be calculated. The calculated power regression equation ($y=ax^b$) can be used as a calibration formula for the said mass spectrometer.

The calibration coefficients a and b are considered as values inherent in the said mass spectrometer. Therefore, the calibration coefficients a and b may vary with a difference between mass spectrometer machines or the machine conditions of the mass spectrometer. The calibration coefficient b is more strongly influenced by a difference between mass spectrometer machines or the machine conditions of the mass spectrometer than the calibration coefficient a. Therefore, in, for example, a power regression equation ($y=ax^b$), the value a may be fixed to 1 ($a=1$) so that only the value b is calculated and adopted as a calibration coefficient. That is, $y=x^b$ may be used as a calibration formula instead of the power regression equation ($y=ax^b$). In such a case where only b is used as a calibration coefficient, the value b is referred to as a calibration value.

[5-1-2. Measurement of Analyte Substances and Calibration]

A sample containing analyte substances is measured by the mass spectrometer for which a calibration formula has been calculated in 5-1-1. to obtain a signal peak intensity of each of the analyte substances. One of the analyte substances (e.g., an internal standard substance) is used as a reference to calculate the ratio of, relative to the signal peak intensity of the analyte substance as a reference, the signal peak intensity of another analyte substance.

The calculated signal peak intensity ratio is calibrated using the calibration formula calculated above in 5-1-1. The signal peak intensity ratio after calibration is a value in which a machine difference from the standard machine is cancelled. That is, the signal peak intensity ratio after calibration is equivalent to a signal peak intensity ratio obtained by measurement using the standard machine. Therefore, the use of signal peak intensity ratios after calibration makes it possible to perform a comparative evaluation of the signal peak intensity ratios of the analyte substances, that is, the abundance ratios of the analyte substances between two or more samples irrespective of a difference between mass spectrometer machines.

[5-2. Calibration by Standardizing Signal Peak Intensity Ratio (Intensity Ratio Calibration)]

[5-2-1. Calculation of Calibration Formula]

A calibration formula for standardizing a signal peak intensity ratio can be calculated using two or more calibrant solutions whose concentration ratio of two calibration substances is known.

Two or more calibrant solutions (intensity ratio calibrants; ICs) whose concentration ratio of two calibration substances is known are used. Two or more solutions may be used which contain one calibration substance at a certain concentration and contain the other calibration substance at different concentrations. For example, solutions may be used which contain SIL-Aβ1-38 at a certain concentration and contain Aβ1-38 at different concentrations so that the concentration ratios of Aβ1-38 to SIL-Aβ1-38 are adjusted to ¼, ½, 1, 2, and 4.

Two or more calibrant solutions (intensity ratio calibrants; ICs) whose concentration ratio of two calibration substances is known are measured by a mass spectrometer for which a calibration formula should be calculated to obtain a signal peak intensity of each of the calibration substances in each of the solutions. For each of the solutions, the ratio of, relative to the signal peak intensity of the calibration substance contained at a certain concentration, the signal peak intensity of the other calibration substance is calculated.

A regression equation is calculated between the known concentration ratio of the two calibration substances in each of the calibrant solutions and the signal peak intensity ratio calculated above. The calculation of a regression equation may appropriately be performed using a known method such as a least-square method or the like. The calculation of a regression equation may be performed using the logarithms of the signal peak intensity ratios. The regression equation may appropriately be selected from among a linear regression equation, a multiple regression equation, an exponential regression equation, a logarithmic regression equation, and a power regression equation.

For example, a linear regression equation may be calculated using the logarithms of the signal peak intensity ratios. Alternatively, a power regression equation may be calculated using the signal peak intensity ratios. The calculated regression equation is defined as a calibration formula for the said mass spectrometer.

For example, when the logarithm of the known concentration ratio of the two calibration substances in each of the solutions is defined as x, and the logarithm of the signal peak intensity ratio calculated by the mass spectrometer for which a calibration formula should be calculated is defined as y, calibration coefficients a and b of:

a linear regression equation ($y=ax+b$)

can be calculated. The calculated linear regression equation ($y=ax+b$) can be used as a calibration formula for the said mass spectrometer.

Alternatively, when the known concentration ratio of the two calibration substances in each of the solutions is defined as x, and the signal peak intensity ratio calculated by the mass spectrometer for which a calibration formula should be calculated is defined as y, calibration coefficients a and b of:

a power regression equation ($y=ax^b$)

may be calculated. The calculated power regression equation ($y=ax^b$) can be used as a calibration formula for the said mass spectrometer.

The calibration coefficients a and b are considered as values inherent in the said mass spectrometer. Therefore, the calibration coefficients a and b may vary with a difference between mass spectrometer machines or the machine conditions of the mass spectrometer. The calibration coefficient b is more strongly influenced by a difference between mass spectrometer machines or the machine conditions of the mass spectrometer than the calibration coefficient a. Therefore, in, for example, a power regression equation ($y=ax^b$), the value a may be fixed to 1 ($a=1$) so that only the value b is calculated and adopted as a calibration coefficient. That is, $y=x^b$ may be used as a calibration formula instead of the power regression equation ($y=ax^b$). In such a case where only b is used as a calibration coefficient, the value b is referred to as a calibration value.

[5-2-2. Measurement of Analyte Substances and Calibration]

A sample containing analyte substances is measured by the mass spectrometer for which a calibration formula has been calculated in 5-2-1. to obtain a signal peak intensity of each of the analyte substances. One of the analyte substances (e.g., an internal standard substance) is used as a reference to calculate the ratio of, relative to the signal peak intensity of the analyte substance as a reference, the signal peak intensity of another analyte substance.

The calculated signal peak intensity ratio is calibrated using the calibration formula calculated above in 5-2-1. The signal peak intensity ratio of the analyte substances is converted by calibration to a signal peak intensity ratio standardized by the calibration substances. In the obtained standardized signal peak intensity ratio, a machine difference is cancelled by the calibration formula. Therefore, it is possible to perform a comparative evaluation of abundance ratios of the analyte substances between two or more samples irrespective of a difference between mass spectrometer machines. Specifically, it is possible to perform direct comparison with the measurement results of mass spectrometry obtained in not only Japan but also other countries such as America and France. Further, this calibration technique is a versatile technique applicable to various researches and examinations using mass spectrometry.

[5-2-3. Calibration Value and Machine Conditions]

As described above, in this embodiment, calibration is performed by calculating a calibration formula for a mass spectrometer used for measurement of analyte substances under the same machine conditions as the measurement of the analyte substances, which makes it possible to, as described above, perform a comparative analysis of the abundance ratios of the analyte substances between two or more samples irrespective of a difference between mass spectrometer machines or the machine conditions of the mass spectrometer.

The calibration formula for intensity ratio calibration can be prepared using two or more calibrant solutions whose concentration ratio of two calibration substances is known. For example, five kinds of solutions may be used which contain SIL-Aβ1-38 at a certain concentration and contain Aβ1-38 at different concentrations so that the concentration ratios of Aβ1-38 to SIL-Aβ1-38 are adjusted to ¼, ½, 1, 2, and 4. In the mass spectrum of each of the solutions, the peak of a certain amount of SIL-Aβ1-38 and the peak of Aβ1-38 that depends on the concentration thereof appear. Ideally, the peak intensity ratios are expected to correspond to the concentration ratios in the respective calibrant solutions. However, the peak intensity ratios vary depending on machine conditions, and therefore a calibration formula is calculated so that the peak intensity ratios correspond to the concentration ratios in the respective calibrant solutions, and the measurement results of analytes are calibrated. This makes it possible to cancel a machine difference.

The calibration formula varies with a difference between mass spectrometer machines. Further, even in the case of the same mass spectrometer, when a part such as a detector or the like is exchanged or a machine setting, such as a detector voltage or the like, is changed. conditions of the mass spectrometer are changed, and therefore the calibration formula varies depending on machine conditions. Further, also when machine conditions are changed due to, for example, deterioration of a detector or the like, the calibration formula may be changed.

For example, when the same sample is measured by a mass spectrometer, a signal peak intensity ratio detected by the mass spectrometer increases due to the influence of machine conditions such as deterioration of a detector or the like. The reason for this is considered to be that the signal peak of a calibrant substance whose abundance is low becomes small due to the influence of machine conditions such as deterioration of a detector or the like. Generally, when a signal peak intensity is excessively low in a mass spectrometer, measurement accuracy reduces from the viewpoint of S/N ratio. Therefore, it is preferred that the signal peak intensity is not excessively low in the mass spectrometer.

For example, in a case where a power regression equation ($y=ax^b$) is determined in 5-2-1, when a signal peak intensity detected by a mass spectrometer becomes low due to the influence of some kind of machine conditions, the calibration value b in the calibration formula increases. Therefore, by allowing the value b to fall within a certain range, the signal peak intensity is prevented from becoming excessively low, and therefore the measurement accuracy of the mass spectrometer further improves so that the accuracy of calibration further improves.

The value b can be varied by changing the detection sensitivity of the mass spectrometer. The value b can be controlled by, for example, changing a detector voltage. Alternatively, the value b may be changed by, for example, changing the baseline level of an analog digital (AD) converter.

According to this embodiment, a comparative evaluation of abundance ratios of analyte substances can be performed between two or more samples irrespective of a difference between mass spectrometer machines or the machine conditions of a mass spectrometer by calibrating the signal peak intensity ratios of the analyte substances using a calibration formula. Further, the signal peak intensity ratios of the analyte substances can more accurately be calibrated by adjusting machine conditions in such a manner that the value of a calibration coefficient in the calibration formula falls within a certain range.

[6. System and Program for Calculating Calibration Value of Mass Spectrometer]

A machine difference calibration system of a mass spectrometer according to an embodiment of the present invention comprises:

- a measuring method preparing unit for preparing a measuring method for measuring a calibrant for calculating a calibration value in a mass spectrometer; and
- a calibration value calculating unit for calculating a calibration value by analysis of mass spectrometry data obtained using the measuring method.

A machine difference calibration program of a mass spectrometer according to an embodiment of the present invention includes allowing a computer to execute

- a measuring method preparing step in which a measuring method for measuring a sample for calculating a calibration value in a mass spectrometer is prepared, and
- a calibration value calculating step in which a calibration value is calculated by analysis of mass spectrometry data obtained using the measuring method.

An embodiment of the system and program for machine difference calibration of a mass spectrometer according to the present invention will be described below with reference to the drawings. The system and program for calculating a calibration value of a mass spectrometer according to this embodiment are intended to calculate a calibration value for performing the calibration (intensity ratio calibration) for standardizing a signal peak intensity ratio described above in 5-2.

Figure 20:
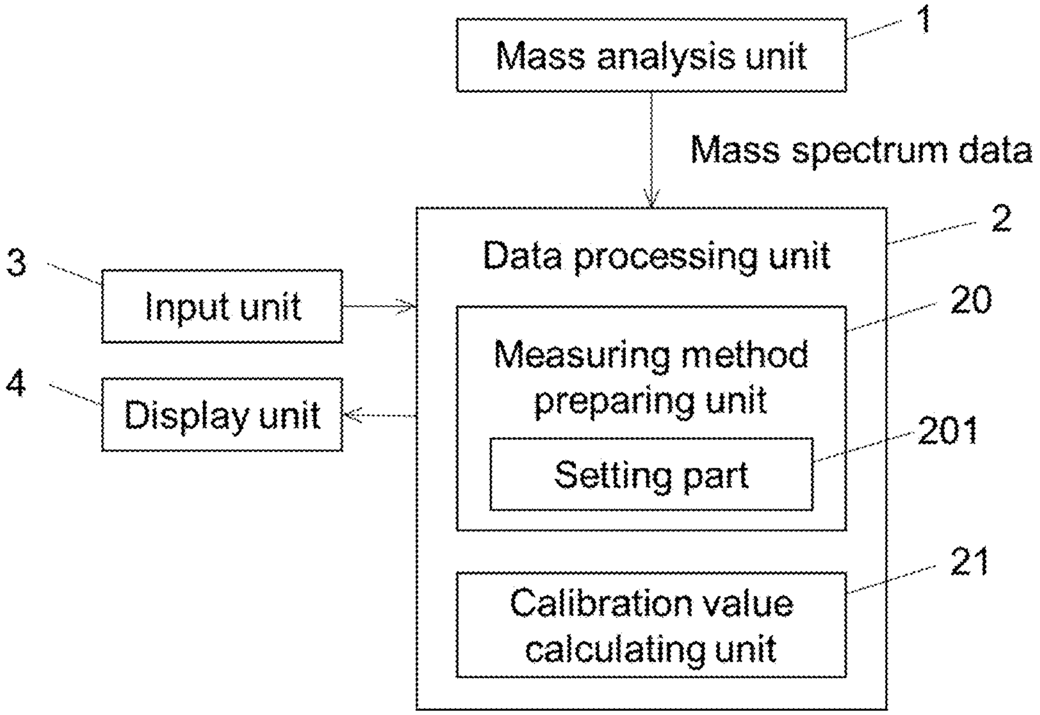
FIG. 20 is a schematic block diagram of an embodiment of a calibration value calculating system of a mass spectrometer according to the present invention.

FIG. 20 is a schematic block diagram of a calibration value calculating system of a mass spectrometer according to this embodiment. As shown in FIG. 20, this system includes a mass analysis unit 1 that performs measurement on a sample, a data processing unit 2 that performs data processing before and after performing measurement, and an input unit 3 and a display unit 4 that are user interfaces. The data processing unit 2 includes, as function blocks, a measuring method preparing unit 20 for preparing a measuring method for measuring a sample for calculating a calibration value in the mass analysis unit 1, and a calibration value calculating unit 21 for calculating a calibration value by analysis of mass spectrum data obtained by the mass analysis unit 1.

The mass analysis unit 1 is not particularly limited, and examples thereof include those for mass spectrometry such as matrix-assisted laser desorption/ionization (MALDI) mass spectrometry or electrospray ionization (ESI) mass spectrometry. For example, a MALDI-TOF (matrix-assisted laser desorption/ionization time-of-flight) mass spectrometer, a MALDI-IT (matrix-assisted laser desorption/ionization ion trap) mass spectrometer, a MALDI-IT-TOF (matrix-assisted laser desorption/ionization ion trap time-of-flight) mass spectrometer, a MALDI-FTICR (matrix-assisted laser desorption/ionization Fourier transform ion cyclotron resonance) mass spectrometer, an ESI-QqQ (electrospray ionization triple quadrupole) mass spectrometer, an ESI-QqTOF (electrospray ionization tandem quadrupole time-of-flight) mass spectrometer, or an ESI-FTICR (electrospray ionization Fourier transform ion cyclotron resonance) mass spectrometer or the like can be used.

Examples of the data processing unit 2 actually used include a general-purpose personal computer and a higher-performance workstation. The data processing unit 2 may be a single computer or a computer system including two or more computers. This embodiment is implemented by installing a dedicated data processing program into such a computer and operating the computer. The input unit 3 is usually a keyboard or a pointing device such as a mouse or the like supplied with the computer. The display unit 4 is usually a monitor supplied with the computer.

Even when the same sample is measured by a mass spectrometer, there is a case where measurement results vary with a difference between machines or the machine conditions of the mass spectrometer. In order to cancel such a machine difference or a difference depending on machine conditions, calibration is performed as described above in 5-2.

The measuring method preparing unit 20 is intended to automatically prepare a measuring method for measuring a calibrant for calculating a calibration value. According to the measuring method prepared by the measuring method preparing unit 20, a sample is measured by the mass analysis unit 1. The measuring method preparing unit 20 further includes a setting part 201. The setting part 201 sets a laser power value used for measuring the calibrant.

The calibration value calculating unit 21 calculates a calibration value using signal peak intensity ratios by analysis of mass spectrum data measured by the mass analysis unit 1.

Figure 21:
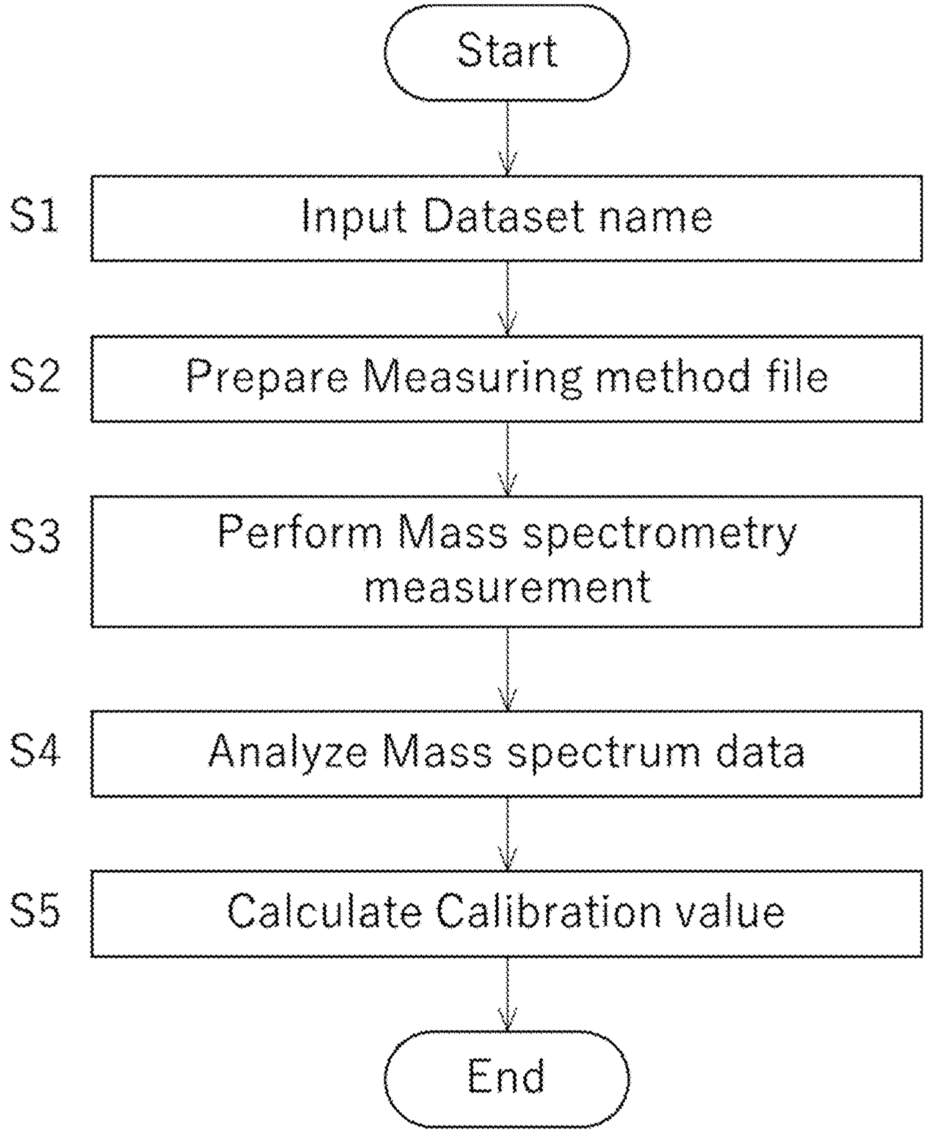
FIG. 21 is a flow chart showing an example of a procedure for calculating a calibration value of a mass spectrometer in the present invention.

Hereinbelow, measurement using the system and program for calculating a calibration value of a mass spectrometer according to this embodiment will be described in detail using FIG. 20 and FIG. 21. FIG. 21 is a flow chart showing a procedure for calculating a calibration value of a mass spectrometer.

A user prepares samples used to calculate a calibration value of a mass spectrometer. As the samples, five kinds of samples (IC1 to IC5) are used whose concentration ratios between an internal standard substance and a target analyte are different stepwise. For example, samples IC-1, IC-2, IC-3, IC-4 and IC-5 are used whose concentration ratios (concentration of the internal standard substance: concentration of the target analyte) are respectively 1:4, 1:2, 1:1, 1:0.5, and 1:0.25.

Figure 22:
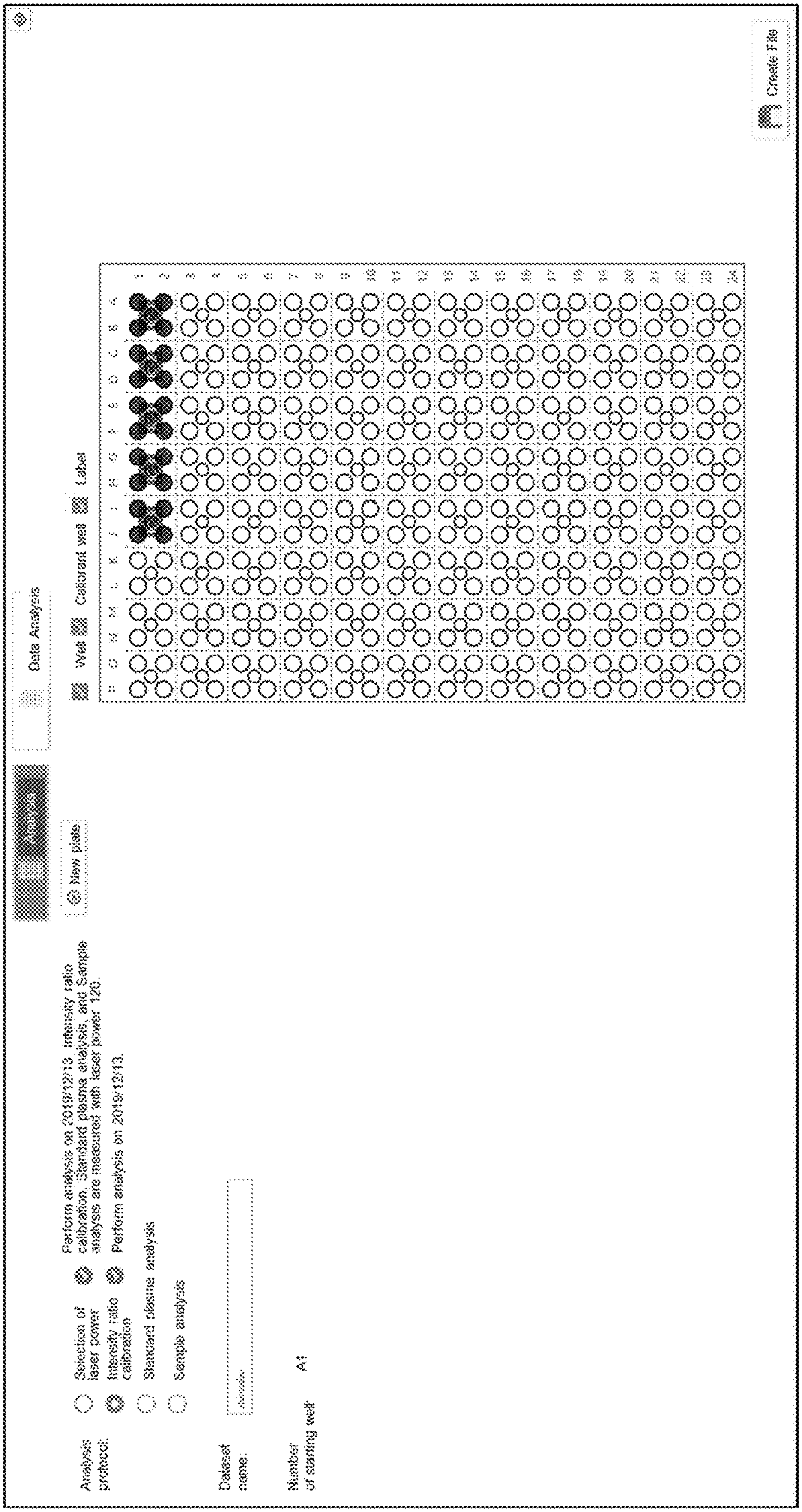
FIG. 22 shows an example of a graphical user interface (GUI) displayed on a display unit 4 when a measuring method is prepared.

Then, the user allows the measuring method preparing unit to automatically prepare a measuring method. FIG. 22 shows an example of a graphical user interface (GUI) displayed on the display unit 4 when the measuring method is prepared. The GUI includes a dataset name input part and a sample plate display part. The user inputs a dataset name and presses a file creation button (S1) by operation performed via the input unit 3.

The measuring method preparing unit 20 prepares a measuring method of the input dataset name (S2: measuring method preparing step). Specifically, a laser power value is previously calculated to set the laser power value of the mass spectrometer used in the measuring method. Further, the sample dropping position of each of the samples IC1 to IC5 is determined. The measuring method preparing unit 20 allows the GUI displayed on the display unit 4 to display the laser power, and allows the sample plate display part of the GUI to diagrammatically show the sample dropping positions of the samples IC1 to IC5.

The laser power can be calculated by various known methods.

For example, the laser power is calculated by the following method. For example, a laser power adjusting method can be used which includes:

- a measuring step in which, while laser power applied to the same sample is changed in n steps (n is an integer of not less than 3), the signal intensity values of an ion derived from a certain component in the said sample are obtained; and
- a processing step in which, in a biaxial graph obtained by plotting a relationship between the laser power and the n signal intensity values obtained in the measuring step or signal values as SN ratios determined from the said signal intensity values, the slopes of straight lines connecting two plotted points adjacent in the direction of a laser power axis are respectively calculated, an index value reflecting a ratio between anterior and posterior slope values that are the slopes of the straight lines anterior and posterior to each plotted point is determined, and appropriate laser power is selected utilizing the said index value.

It should be noted that the calculated laser power may vary between wells in a sample plate. For example, laser power calculated for wells (calibrant wells) into which the samples IC1 to IC5, which are measured by the present measuring method and used to calculate a calibration value, are to be dropped may be different from laser power used for wells (sample wells) used to measure a real sample to be analyzed. For example, laser power used for calibrant wells may be lower by 10 than that used for sample wells.

The sample dropping positions can be determined by various known methods.

The determined sample dropping positions are displayed on the sample plate display part as shown in FIG. 22. In FIG. 22, for example, sample dropping positions can be determined so that IC-1, IC-2, IC-3, IC-4, and IC-5 are to be dropped into wells in the uppermost line from the right edge.

The user drops the calibrants IC1 to IC5 onto the sample dropping positions displayed on the display unit 4 to start measurement. The mass analysis unit 1 measures each of the calibrants under predetermined conditions (S3).

Figure 23:
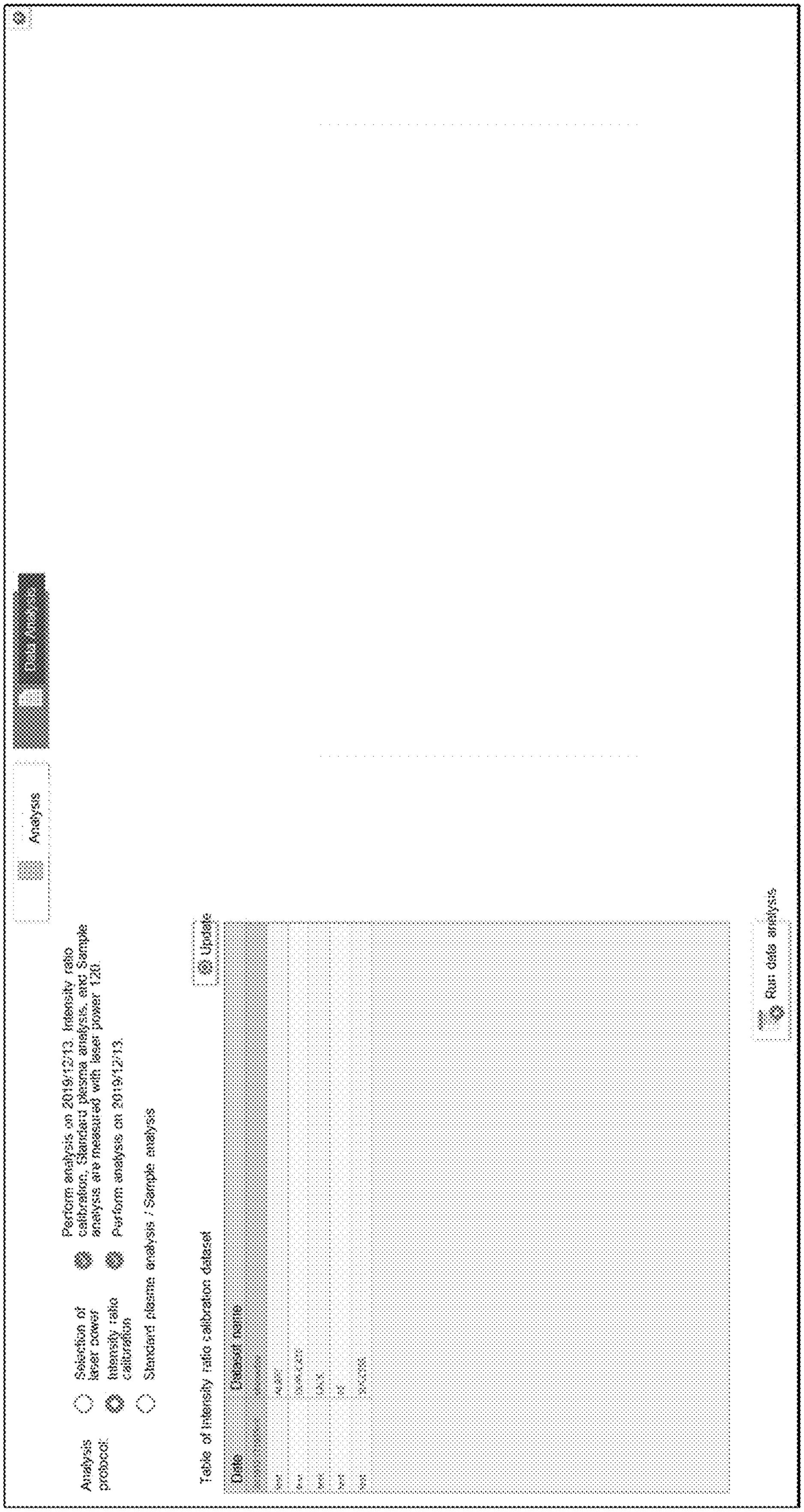
FIG. 23 shows an example of a graphical user interface (GUI) displayed on the display unit 4 when a calibration value is calculated.

When the measurement ends, the user performs operation for calculating a calibration value. FIG. 23 shows an example of a graphical user interface (GUI) displayed on the display unit 4 when a calibration value is calculated. The user selects the dataset name and presses an analysis button by operation performed via the input unit 5.

The calibration value calculating unit 21 analyzes mass spectrum data measured by the mass analysis unit 1 in the selected dataset name (S4), and calculates a calibration value (S5). The calibration value calculating step includes S4 and S5. The calibration value can be calculated using, for example, the method described above in [5. Calibration of measurement results in mass spectrometer].

Specifically, the ratio of the signal peak intensity of the target analyte relative to the signal peak intensity of the internal standard substance is calculated for each of the samples IC1 to IC5. A power regression equation ($y=ax^b$) can be calculated between the concentration ratio of the target analyte relative to the internal standard substance in each of the solutions and the signal peak intensity ratio calculated above. The calibration coefficient b of the calculated regression equation is output as a calibration value b. The calibration value b is displayed on the GUI of the display unit 4.

Then, the user allows the mass analysis unit 1 to measure a sample to be analyzed to obtain a measurement result calibrated using the value b.

EXAMPLES

Hereinbelow; the present invention will be described more specifically with reference to examples, but is not limited to these examples.

Various kinds of peptides were measured by three mass spectrometers (all of which are of the same type: Performance) to examine differences in peak intensity ratios between these machines. As a result, it was found that the logarithms of the peak intensity ratios had a linear relation between the machines. It was confirmed that the peak intensity ratios could be calibrated by preparing a linear regression equation on the basis of logarithms of measured values between the machines. Further, it was confirmed that since the logarithms of the peak intensity ratios have a linear relation, the peak intensity ratios have an exponential (power) relation when not converted to logarithms, and therefore the peak intensity ratios could be calibrated also by preparing an exponential (power) regression equation (power approximate equation).

In order to achieve a more practical method, samples for intensity ratio calibration were prepared which contained a stable isotope-labeled substance (at a certain concentration) and the same non-labeled substance (at different concentrations). These samples were measured by the mass spectrometer, a power approximate equation was prepared from the intensity ratios and abundance ratios of the substances as a calibration formula, and the peak intensity ratios of the analyte substances were calibrated using the calibration formula.

The peak intensity ratios obtained by each of the machines were calibrated using the regression equation. The calibration made it possible to obtain equivalent peak intensity ratios even when the same sample was measured by different machines. Further, the calibration is effective at calibrating peak intensity ratios that vary due to the exchange, voltage change, or deterioration of a detector. It is possible to perform a comparative evaluation of abundances of analyte substances using one kind of stable isotope-labeled substance without preparing a stable isotope-labeled substance for each of the target analyte substances.

This method can be used not only for peptides obtained by IP but also for peptides generated by digestion of protein with an enzyme such as peptidase or the like or peptides fractionated by chromatography. Further, this method can be used not only for peptides but also for glycopeptides, sugar chains, or lipids.

Hereinbelow, the examples will be described in more detail.

Example 1: Calibration Method for Standardizing Peak Intensity Ratios to Those of One Machine

[1-1 Measurement of Aβ and Aβ Related Peptides in Blood Plasma]

In this example, Aβ and Aβ related peptides as analyte substances were prepared in the following manner.

each of the Aβ and Aβ related peptides relative to the internal standard peptide (SIL-Aβ1-38) in spectrums obtained by measuring the 4 wells was used. A detection limit was an S/N ratio of 3, and peaks of not more than the detection limit were regarded as not detectable. The amino acid sequences of the measured Aβ and Aβ related peptides are shown in Table 1.

TABLE 1

| SEQ ID NO. | Name | Sequence of Amino Acid |
|---|---|---|
| 1 | Aβ6-38 | HDSGYEVHHQKLVFFAEDVGSNKGAIIGLMVGG |
| 2 | Aβ1-33 | DAEFRHDSGYEVHHQKLVFFAEDVGSNKGAIIG |
| 3 | Aβ6-40 | HDSGYEVHHQKLVFFAEDVGSNKGAIIGLMVGGVV |
| 4 | Aβ1-35 | DAEFRHDSGYEVHHQKLVFFAEDVGSNKGAIIGLM |
| 5 | Aβ1-37 | DAEFRHDSGYEVHHQKLVFFAEDVGSNKGAIIGLMVG |
| 6 | Aβ3-40 | EFRHDSGYEVHHQKLVFFAEDVGSNKGAIIGLMVGGVV |
| 7 | Aβ1-40 | DAEFRHDSGYEVHHQKLVFFAEDVGSNKGAIIGLMVGGVV |
| 8 | OxAβ1-40 | DAEFRHDSGYEVHHQKLVFFAEDVGSNKGAIIGL<u>M</u>VGGVV |
| 9 | Aβ1-42 | DAEFRHDSGYEVHHQKLVFFAEDVGSNKGAIIGLMVGGVVIA |
| 10 | APP669-711 | VKMDAEFRHDSGYEVHHQKLVFFAEDVGSNKGAIIGLMVGGVV |

A blood plasma sample (Sample No. 1) was subjected to immunoprecipitation-mass spectrometry (IP-MS) using SIL-Aβ1-38 as an internal standard peptide.

First, 0.5 μL of a matrix solution (0.5 mg/mL α-cyano-4-hydroxycinnamic acid: CHCA, 0.2% (w/v) Methanediphosphonic acid: MDPNA) was added to wells of a μFocus MALDI Plate™ 900 μm and dried.

IP was performed in the following manner. Antibody-immobilized beads obtained by immobilizing anti-Aβ monoclonal antibodies (clones 6E10) and 4G8) to magnetic beads were washed twice with an OTG-glycine buffer (1% n-Octyl-β-D-thioglucoside (OTG), 50 mM glycine, pH 2.8) and washed three times with 100 μL of a washing buffer. Then, 250 μL of the blood plasma sample was mixed with 250 μL of a binding buffer (0.2% (w/v) n-Dodecyl-β-D-maltoside (DDM), 0.2% (w/v) n-Nonyl-β-D-thiomaltoside (NTM), 800 mM GlcNAc, 100 mM Tris-HCl, 300 mM NaCl, pH 7.4) containing 10 pM SIL-Aβ1-38 (AnaSpec, San Jose, CA, USA), the antibody-immobilized beads were then added thereto, and the resultant was incubated at 4° C. for 1 hour to capture Aβ and Aβ related peptides. Then, the resultant was washed once with a washing buffer (500 μL or 100 μL), washed four times with 100 μL of a washing buffer, and washed twice with 50 mM ammonium acetate (50 μL or 20 μL). Further, the resultant was washed once with $H_2O$ (30 μL or 20 μL), and then the Aβ and Aβ related peptides captured by the antibody-immobilized beads were eluted with 5 μL of 70% acetonitrile containing 5 mM hydrochloric acid. Then, 1 μL of the eluate was dropped into each of 4 wells in the μFocus MALDI Plate™ 900 μm to which the matrix had been added. The resultant was measured using three machines of AXIMA Performance (Shimadzu/KRATOS, Manchester, UK) by Linear TOF in a positive ion mode. A mass spectrum was obtained by integrating 40 shots per each of the points of 400 spots in a raster mode. As a quantitative value, an average of peak intensity ratios of

[1-2 Comparative Analysis of Peak Intensity Ratios Between Machines]

FIG. 1(A) shows the peak intensity ratios of the Aβ and Aβ related peptides relative to the internal standard peptide (SIL-Aβ1-38) obtained by IP-MS of the blood plasma sample (Sample 1). The same sample was measured using the three machines of the same type of mass spectrometer (Performance 1 to Performance 3), but the peak intensity ratios of almost all of the Aβ and Aβ related peptides were different between the three machines. The coefficient of variation (CV) of Aβ1-40 was 48.7% and the CV of Aβ1-42 was 54.0%, from which it was confirmed that the difference in the peak intensity ratio of Aβ1-40 or Aβ1-42 was particularly large between the three machines. On the other hand, the CV of Aβ6-40 was 3.8%, that is, the results of Aβ6-40 obtained by the three machines were almost the same. The peak intensity ratios of Aβ6-40 are close to 1, but the peak intensity ratios of Aβ1-40 or Aβ1-42 are far from 1. This indicated that when the peak intensity ratios were closer to 1, the difference between the three machines tended to be smaller, and when the peak intensity ratios were farther from 1 (i.e., when the peak intensity ratios were smaller than 1 or larger than 1), the difference between the three machines tended to be larger.

Further, also in the case of the peak intensity ratio of each of the Aβ, Aβ related peptides, and SIL-Aβ1-38 relative to APP669-711, the difference between the three machines tended to be smaller when the peak intensity ratios were closer to 1, and the difference between the three machines tended to be larger when the peak intensity ratios were farther from 1 (FIG. 1(B)).

FIG. 2 shows the average and CV of peak intensity ratios of each of the Aβ and Aβ-related peptides relative to the internal standard peptide (SIL-Aβ1-38) measured by the three mass spectrometers, and the average and CV of peak intensity ratios of each of the Aβ, Aβ-related peptides and SIL-Aβ1-38 relative to APP669-711 measured by the three mass spectrometers. As can be seen from this diagram, the CV between the three machines was smaller when the peak intensity ratio was closer to 1, and the CV between the three machines was larger when the peak intensity ratio was farther from 1.

The present inventors analyzed whether there was a rule in the difference in peak intensity ratio between the three machines, and as a result, values obtained by logarithmic transformation of the peak intensity ratios had a linear relation between the machines (FIG. 3). A regression line between Performance 1 and Performance 2 and a regression line between Performance 1 and Performance 3 were confirmed to have excellent linearity because their coefficients of determination $R^2$ were not less than 0.985 ($R^2 \geq 0.985$). The linear regression equations between the machines are as follows.

The linear regression equation between Performance 1 and Performance 2:

$$y = 1.282x + 0.045,$$

wherein x is a value obtained by logarithmic transformation of the signal peak intensity ratio measured by Performance 2, and y is a value obtained by logarithmic transformation of the signal peak intensity ratio measured by Performance 1.

The linear regression equation between Performance 1 and Performance 3:

$$y = 1.981x + 0.081,$$

wherein x is a value obtained by logarithmic transformation of the signal peak intensity ratio measured by Performance 3, and y is a value obtained by logarithmic transformation of the signal peak intensity ratio measured by Performance 1.

Although exactly the same as above, when logarithmic transformation is not performed, the relationship between the machines is represented by a power approximate equation (FIG. 4).

The power approximate equation between Performance 1 and Performance 2:

$$y = 1.108x^{1.282},$$

wherein x is a value of the signal peak intensity ratio measured by Performance 2, and y is a value of the signal peak intensity ratio measured by Performance 1.

The power approximate equation between Performance 1 and Performance 3:

$$y = 1.204x^{1.981},$$

wherein x is a value of the signal peak intensity ratio measured by Performance 3, and y is a value of the signal peak intensity ratio measured by Performance 1.

The present inventors examined whether, when Performance 1 was used as a standard machine, the peak intensity ratios of the Aβ and Aβ related peptides relative to the internal standard peptide (SIL-Aβ1-38) measured by Performance 2 and Performance 3 could be calibrated to be equivalent to the peak intensity ratios measured by the standard machine (Performance 1) by using these regression equations. The peak intensity ratios measured by Performance 2 and Performance 3 were calibrated by plugging in them for x in the above regression equations and determining y (FIG. 5). Calibrated values are represented as Performance 2 (Cal.) and Performance 3 (Cal.). As a result, the differences in the peak intensity ratios of all the peptides between the three machines were reduced and the CVs were also reduced. The calibrated values obtained using the linear regression equation calculated using logarithmically transformed values and the calibrated values obtained using the power approximate equation were the same.

This result indicates that even when the same sample is measured by different mass spectrometers, the same peak intensity ratios can be obtained by calibrating peak intensity ratios using a calibration formula. In other words, this result indicates that the calibration formula makes it possible to cancel errors (machine difference) of peak intensity ratios caused by a difference between mass spectrometer machines.

The reason why logarithms of the peak intensity ratios have a linear relationship between the machines is considered to be that a secondary electron multiplier (SEM) used as a detector for mass spectrometry exponentially amplifies the electric signals of ions so that large signals are obtained.

[1-3 Validation of Calibration Formulas]

In order to examine whether the calibration formulas prepared in 1-2 were applicable to other samples, blood plasma samples (Sample No. 2 and Sample No. 3) different from the sample used above in 1-1 were subjected to IP-MS, and peak intensity ratios before and after calibration were compared. The IP-MS was performed in the same manner in 1-1, and linear regression equations calculated in 1-2, that is, linear regression equations calculated using logarithmically transformed values of the peak intensity ratios were used as calibration formulas. As a result, it was confirmed that in the cases of both Sample No. 2 and Sample No. 3, the peak intensity ratios obtained by the three machines became equivalent by calibration (FIGS. 6 and 7). Some of the machines are poor in detection sensitivity for some of the peptides. In such a case, data not more than the detection limit is denoted as ND (Not detectable).

These results indicate that when any of the samples (Samples No. 1, No. 2, and No. 3) is measured by the three machines, equivalent peak intensity ratios can be derived by performing calibration using the calibration formulas prepared in 1-2, and demonstrate the validity of the calibration formulas.

[1-4 Verification of Reproducibility of Calibration Formulas]

The reproducibility of the calibration formulas prepared in 1-2 was verified. IP-MS was performed in the same manner as in 1-1 in a day different from the day when 1-1 was performed to prepare calibration formulas (linear regression equations using logarithmically transformed values) (FIGS. 8 and 9). The day when 1-1 was performed was called “Day 1”, and the day when the regression equations for calibration (linear regression equations using logarithmically transformed values) were newly prepared was called “Day 2”. The calibration formulas between the machines obtained in Day 1 and Day 2 are shown in Table 2.

TABLE 2

| Regression equation for calibration | Day 1 | Day 2 |
|---|---|---|
| Regression equation between Performance 1 (Standard machine) and Performance 2 | y = 1.282x + 0.045 | y = 1.349x − 0.025 |
| Regression equation between Performance 1 (Standard machine) and Performance 3 | y = 1.981x + 0.081 | y = 1.948x + 0.009 |

Analysis of covariance (ANCOVA) was performed to verify whether the calibration formulas between the machines obtained in Day 1 and Day 2 were the same. First, in the test of ANCOVA between 4 groups, analysis was performed using a statistical significance of $p<0.05$. As a result, the slope was $p<0.0001$. This demonstrated that the four groups were statistically significantly different from each other.

Then, a pairwise comparison between the 4 groups was performed by ANCOVA (Table 3). In this case, the test needed to be performed four times, and therefore a statistical significance of $p<0.0125$ was set by Bonferroni correction. First, the slopes of the regression equations were tested, and when significant differences were not observed, the intercepts of the regression equations were tested. As a result, a comparison between Performance 2 (Day 1) and Performance 3 (Day 1) and a comparison between Performance 2 (Day 2) and Performance 3 (Day 2) demonstrated that the regression equations were different; and a comparison between Performance 2 (Day 1) and Performance 2 (Day 2) and a comparison between Performance 3 (Day 1) and Performance 3 (Day 2) demonstrated that the regression equations were the same. These results indicate that the machines have their respective own regression equations as calibration formulas, and the regression equations do not vary according to a measurement day unless the conditions of the machines do not change due to, for example, the deterioration of a detector or the like.

TABLE 3

| Combination for Comparison | ANCOVA |
|---|---|
| Performance 2 (Day1) vs Performance 3 (Day 1) | Slope: $p < 0.0001$ |
| Performance 2 (Day2) vs Performance 3 (Day 2) | Slope: $p < 0.0001$ |
| Performance 2 (Day1) vs Performance 2 (Day 2) | Slope: $p = 0.1384$, Intercept: $p = 0.0277$ |
| Performance 3 (Day1) vs Performance 3 (Day 2) | Slope: $p = 0.7133$, Intercept: $p = 0.0677$ |

Example 2: Peak Intensity Ratio Calibration Method by Standardization

[2-1 Measurement of Aβ and Aβ Related Peptides in Blood Plasma]

In this example, Aβ and Aβ related peptides as analyte substances were prepared in the following manner.

Aβ related peptides in human blood plasma were measured using IP-MS in which immunoprecipitation (IP) using an anti-Aβ monoclonal antibody and mass spectrometry (MS) were performed in combination. In the IP, antibody beads were used which were prepared by covalently bonding an anti-Aβ antibody clone 6E10 (BioLegend) to Dynabeads Epoxy (Thermo Fisher Scientific) as magnetic beads. Two hundred and fifty microliters (250 μL) of blood plasma and 250 μL of a reaction solution containing an internal standard peptide were mixed, and the antibody beads were added thereto to perform an antigen-antibody reaction at 4° C. for 1 hour (1st IP). As the internal standard peptide, 11 pM of stable isotope-labeled (SIL) Aβ1-38 was used. After the antigen-antibody reaction, the antibody beads were washed, and the Aβ related peptides were eluted using a 1st IP eluent (glycine buffer containing DDM (pH 2.8)). The eluate was neutralized with a tris buffer containing DDM, an antigen-antibody reaction was then again performed between the antibody beads and the Aβ related peptides (2nd IP), the antibody beads were washed, and the Aβ related peptides were then eluted with a 2nd IP eluent (5 mM HCl, 0.1 mM Methionine, 70% (v/v) acetonitrile). In advance, 0.5 μL of 0.5 mg/mL CHCA/0.2% (w/v) MDPNA was dropped into each well of a μFocus MALDI Plate™ 900 μm (Hudson Surface Technology, Inc., Fort Lee, NJ) and dried. The eluate after IP was dropped into four wells of the μFocus MALDI Plate™ 900 μm and dried.

Mass spectrum data was obtained using AXIMA Performance (Shimadzu/KRATOS, Manchester, UK) by Linear TOF in a positive ion mode. The m/z value of Linear TOF was indicated by the average mass of peaks. The m/z value was calibrated using, as external standards, human angiotensin II, human ACTH fragment 18-39, bovine insulin oxidized beta-chain, and bovine insulin. A mass spectrum was obtained by integrating 40 shots per each of the points of 400 spots in a raster mode. As a quantitative value, an average of peak intensity ratios of each of the Aβ and Aβ related peptides relative to the internal standard peptide (SIL-Aβ1-38) in spectrums obtained by measuring the 4 wells was used. A detection limit was an S/N ratio of 3, and peaks of not more than the detection limit were regarded as not detectable.

[2-2 Measurement of Intensity Ratio Calibrants (ICs)]

Five kinds of concentrated solutions of intensity ratio calibrant (IC) reagents for calibrating the peak intensity ratios of the Aβ and Aβ-related peptides relative to SIL-Aβ1-38 obtained by IP-MS were prepared to have compositions shown in Table 4 and preserved by freezing. Before MS measurement, the concentrated solutions IC-1 to IC-5 were thawed and diluted 10-fold with the 2nd IP eluent (5 mM HCl, 0.1 mM Methionine, 70% (v/v) acetonitrile) used in 2-1 to prepare IC-1 to IC-5. In advance, 0.5 μL of 0.5 mg/mL CHCA/0.2% (w/v) MDPNA was dropped into each well of a μFocus MALDI Plate™ 900 μm and dried. Each of the IC-1 to IC-5 was dropped into four wells in an amount of 1 μL per well and dried. The protein/peptide compositions of the IC-1 to IC-5 are shown in Table 5. The abundance ratios of Aβ1-38 to SIL-Aβ1-38 in the IC-1 to IC-5 were set to 4, 2, 1, ½, and ¼, respectively.

TABLE 4

| | Concentrated solution of IC-1 | Concentrated solution of IC-2 | Concentrated solution of IC-3 | Concentrated solution of IC-4 | Concentrated solution of IC-5 |
|---|---|---|---|---|---|
| Aβ1-38 | 10 fmol/μL | 5 fmol/μL | 2.5 fmol/μL | 1.25 fmol/μL | 0.625 fmol/μL |
| SIL-Aβ1-38 | 2.5 fmol/μL | | | | |
| Others | Aβ1-33 (7.5 fmol/μL), Aβ1-34 (5 fmol/μL), Aβ1-36 (2.5 fmol/μL), Aβ1-37 (1.25 fmol/μL), APP669-711 (1.25 fmol/μL), BSA (100 ng/μL) | | | | |

TABLE 5

| | IC-1 | IC-2 | IC-3 | IC-4 | IC-5 |
|---|---|---|---|---|---|
| Aβ1-38 | 1000 amol/μL | 500 amol/μL | 250 amol/μL | 125 amol/μL | 62.5 amol/μL |
| SIL-Aβ1-38 | 250 amol/μL | | | | |
| Others | Aβ1-33 (750 amol/μL), Aβ1-34 (500 amol/μL), Aβ1-36 (250 amol/μL), Aβ1-37 (125 amol/μL), APP669-711 (125 amol/μL), BSA (10 ng/μL) | | | | |

The mass spectrum data of each of the IC-1 to IC-5 was obtained in the same manner as in 2-1.

[2-3 Intensity Ratio Calibration]

IP-MS of human blood plasma and measurements of the IC-1 to IC-5 were performed under three conditions of before and after exchange of a detector of Performance 1, and after exchange of a detector of Performance 3.

Power approximate equations were prepared from the intensity ratios and the abundance ratios of Aβ1-38 relative to SIL-Aβ1-38 in the mass spectra of the IC-1 to IC-5 (FIG. 10). As shown in FIG. 10, even when the abundance ratios are the same, the peak intensity ratios are different depending on the conditions of the machines, and therefore the power approximate equations are also different. Calibration processing is performed by standardizing these power approximate equations to y=x.

Power approximate equation: $y=ax^b$, wherein x is the abundance ratio of Aβ1-38/SIL-Aβ1-38, y is the peak intensity ratio of Aβ1-38/SIL-Aβ1-38, and a and b are coefficients in the approximate equation.

In FIG. 10(A), $$y = 1.0032x^{1.0402}.$$

In FIG. 10(B), $$y = 1.0413x^{0.8182}.$$

In FIG. 10(C), $$y = 1.0353x^{0.7714}.$$

As shown in FIG. 4 and FIG. 10, the value a in the power approximate equation does not change depending on machine conditions, but the value b is greatly influenced by machine conditions. Therefore, evaluation was performed by two methods: one was a method in which calibration was performed using the value a and the value b obtained by IC measurement, and the other was a method in which calibration was performed by fixing the value a to 1 (a=1) and using only the value b.

The peak intensity ratios of the Aβ and Aβ related peptides relative to SIL-Aβ1-38 were calculated from the mass spectrum of IP-MS, and calibrated by being plugged into an IC curve, that is, into the power approximate equation calculated using the measurement results of the IC-1 to IC-5. Specifically, the power approximate equations were standardized to y=x by plugging in the peak intensity ratios obtained by IP-MS for y to determine x. The averages of the quadruple measurement data (n=4) of the peak intensity ratios were calculated and used for analysis.

FIG. 11 shows the results of calibration performed by the method in which calibration is performed using only the value b by fixing the value a in the power approximate equation to 1 (a=1). Differences in the peak intensity ratios of the Aβ and Aβ related peptides relative to SIL-Aβ1-38 between the three conditions were reduced by calibration using the power approximate equations, and the coefficients of variation (CVs) were reduced from 16.8 to 21.5% (before calibration) to 3.9 to 13.6% (after calibration).

Further, APP669-711/Aβ1-42 and Aβ1-40/Aβ1-42 functioning as biomarkers were also evaluated. In the case of APP-669-711/Aβ1-42, differences in peak intensity between them before calibration were small and CV was also sufficiently small because the intensity ratios were close to 1, and therefore the effect of calibration was not observed. On the other hand, in the case of Aβ1-40/Aβ1-42, the intensity ratios were large, and therefore CV was reduced from 41.1% (before calibration) to 8.0% (after calibration) (FIG. 12).

Furthermore, it was observed that also in the case of the method in which calibration was performed using the value a and the value b, CVs of the peak intensity ratios of the Aβ and Aβ related peptides relative to SIL-Aβ1-38 between the three conditions were effectively reduced, and the results of the biomarkers were exactly the same as the results obtained by the method in which a=1 (FIGS. 13 and 14).

The above results indicated that these calibration methods were effective at reducing variations in peak intensity ratios between machines. Further, the above results indicated that the value a did not change depending on machine conditions, and therefore even when only the value b was used as a calibration value, variations in peak intensity ratios between machines were effectively reduced. The method of Example 2 standardizes peak intensity ratios by using power approximate equations, and therefore can be applied without the necessity of using a certain machine as a standard machine.

[2-4 Validation of Intensity Ratio Calibration]

A sample obtained by spiking standard blood plasma with three kinds of Aβ peptides (Aβ1-40, Aβ1-42, and APP669-711) and an internal standard peptide was subjected to IP treatment, and the sample and IC reagents were measured by three machines of AXIMA-Performance. The machines used for measurement, detector voltages, and values b calculated from the results of IC measurement are shown in Table 6.

TABLE 6

| | Detector voltage (value b) | | |
|---|---|---|---|
| AXIMA-Performance 1 | 2800 V (1.0917) | 2825 V (1.0392) | 2850 V (0.9560) |
| AXIMA-Performance 3 | 2750 V (0.9547) | 2775 V (0.9141) | |
| AXIMA-Performance 4 | 2850 V (0.9371) | | |

It should be noted that there is a correlation between the value b and the detector voltage, and therefore the value b can be adjusted by the detector voltage.

The intensity ratios of Aβ1-40, Aβ1-42, and APP669-711 relative to the internal standard were read from obtained mass spectra, and biomarkers (APP669-711/Aβ1-42 and Aβ1-40/Aβ1-42) were compared between when the intensity ratios were calibrated by the value b and when the intensity ratios were not calibrated.

Figure 15:
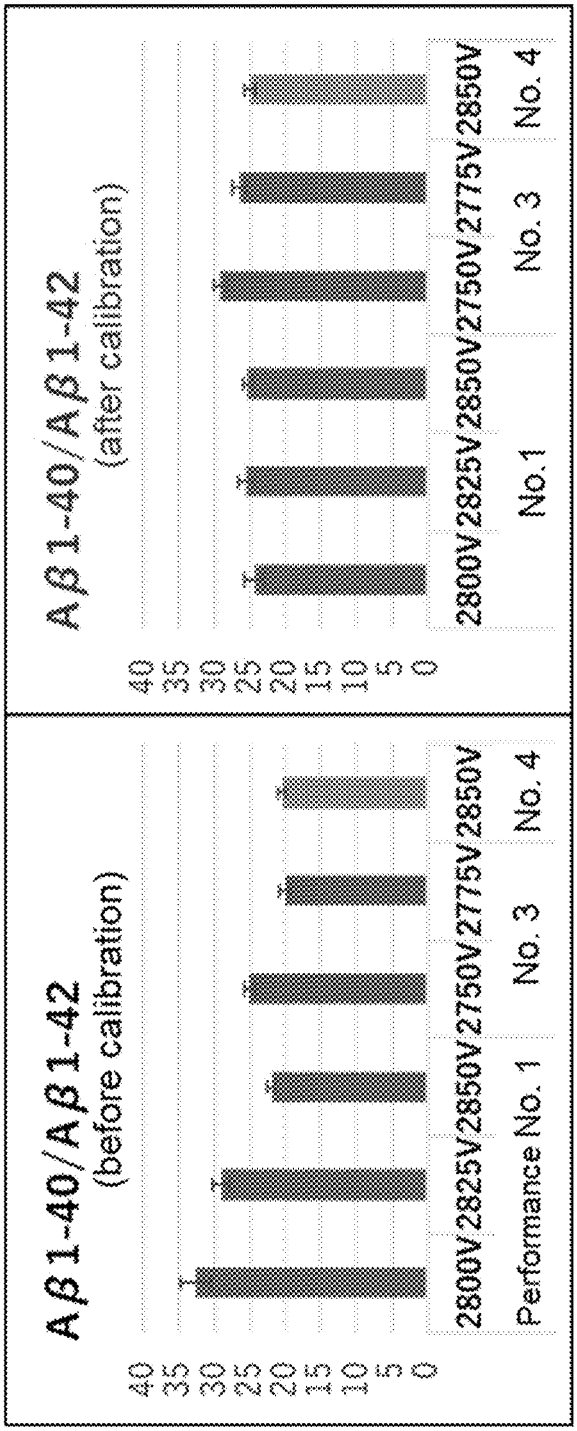
FIG. 15 shows a comparison of the ratios of Aβ1-40/Aβ1-42 between before and after calibration using the value b, wherein error bars are standard deviations of three-set measurement.

FIG. 15 shows a comparison of the ratios of Aβ1-40/Aβ1-42 between before and after calibration. The data before calibration shows large variations between the three machines, and also when the detector voltage is changed in one machine, variations are large. It was confirmed that when calibration was performed using the value b, variations between the three machines were reduced, and the peptide ratios were maintained constant even when the detector voltage was changed in one machine.

Figure 16:
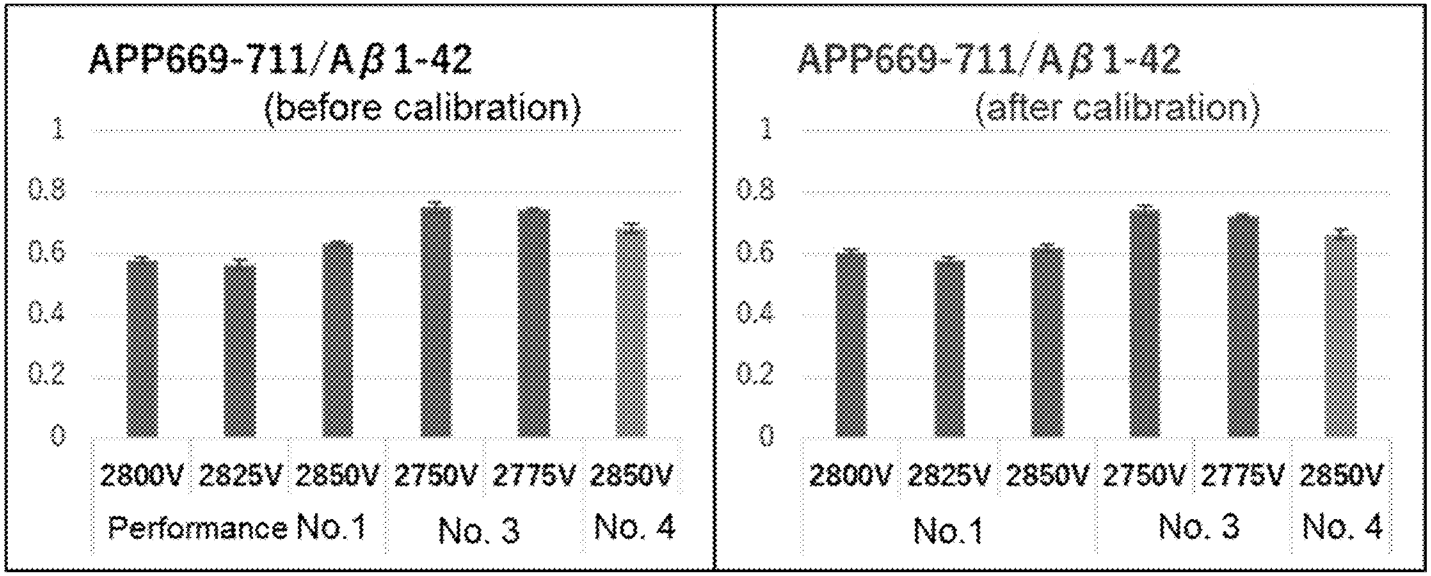
FIG. 16 shows a comparison of the ratios of APP669-711/Aβ1-42 between before and after calibration using the value b, wherein error bars are standard deviations of three-set measurement.

FIG. 16 shows a comparison of the ratios of APP669-711/Aβ1-42 between before and after calibration. The differences in intensity between APP699-711 and Aβ1-42 are small, and even before calibration, variations in the ratios of APP669-711/Aβ1-42 between the three machines are small and the variations when the detector voltage is changed in one machine are small. However, it was conformed that variations could further be reduced by performing calibration using the value b.

The following Table 7 shows CVs of the Aβ peptide ratios calculated on the basis of data classified by focusing the value b.

TABLE 7

| Comparison of CV between before and after calibration using value b | | Total | Detector voltage change in one machine (2800, 2825, 2850 V) | Small variations in value b between three machines [1] | Large variations in value b between three machines [2] |
|---|---|---|---|---|---|
| Aβ1-40/Aβ1-42 | Before calibration | 18.7% | 15.8% | 8.5% | 24.0% |
| | After calibration | 6.0% | 2.2% | 7.1% | 3.6% |
| APP669-711/Aβ1-42 | Before calibration | 11.1% | 4.9% | 7.1% | 10.1% |
| | After calibration | 9.2% | 2.9% | 7.5% | 7.1% |

[1] three conditions of P1 2850 V (0.9560), P3 2750 V (0.9547), P4 2850 V (0.9371)
[2] three conditions of P1 2800 V (1.0917), P3 2775 V (0.9141), P4 2850 V (0.9371)

"Total" represents CVs calculated using all the results measured under six conditions.

"Detector voltage change in one machine" represents CVs calculated using the results measured under three conditions achieved by changing the detector voltage in the machine P1.

"Small variations in value b between three machines" represents CVs calculated using the results measured by the three machines under the condition where the values b are close to 0.95.

"Large variations in value b between three machines" represents CVs calculated using the results measured by the three machines under three conditions where the values b are different.

In the case of "Small variations in value b between three machines", the CVs are originally low, and therefore there is no large difference between before and after calibration, but in other cases, it is clear that the CVs are greatly reduced by calibration using the value b. This indicates that calibration using the value b is effective in both cases where a machine setting is changed in one machine and where machine conditions are different between different machines.

Example 3: Adjustment 1 of Calibration Value b

As described in 2-4 in Example 2, since there is a correlation between the value b and the detector voltage, the value b can be adjusted by the detector voltage. Hereinbelow, the results of examination of the relationship between the value b and the detector voltage will be shown.

IC measurements were performed using, as calibration substances, normal Aβ1-38 and stable isotope-labeled Aβ1-38 (SIL-Aβ1-38) which were the same in ionization efficiency. As IC1 to IC5, the same IC1 to IC5 as used in 2-2 in Example 2 were used.

Figure 17:
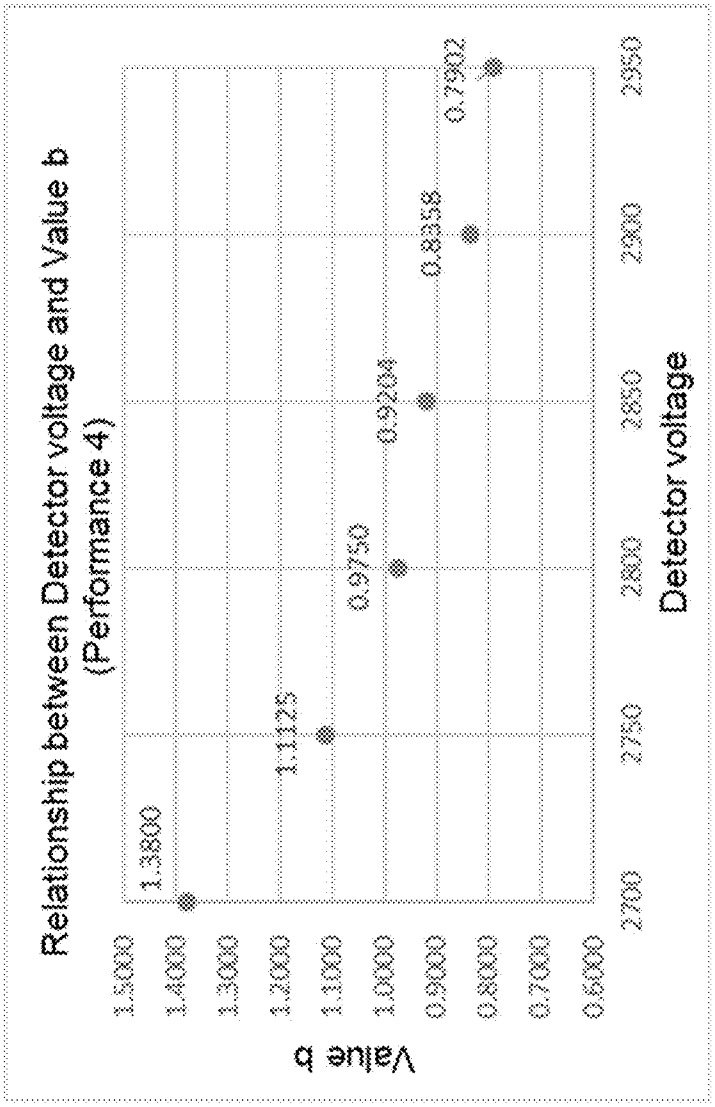
FIG. 17 shows a relationship between the detector voltage of Performance 4 and the value b of a calibration formula, wherein a vertical axis represents the value b and a horizontal axis represents the detector voltage.

The IC measurements were performed by the mass spectrometer (Performance 4) by setting the detector voltage to 2700 V, 2750 V, 2800 V, 2850 V, 2900 V, and 2950 V, respectively. As in the case of 2-3 in Example 2, a calibration formula (power approximate equation: $y=ax^b$) was determined using measurement results at different detector voltages. FIG. 17 is a diagram showing the relationship between the detector voltage and the value b of the calibration formula. The vertical axis represents the value b and the horizontal axis represents the detector voltage (V).

Figure 18:
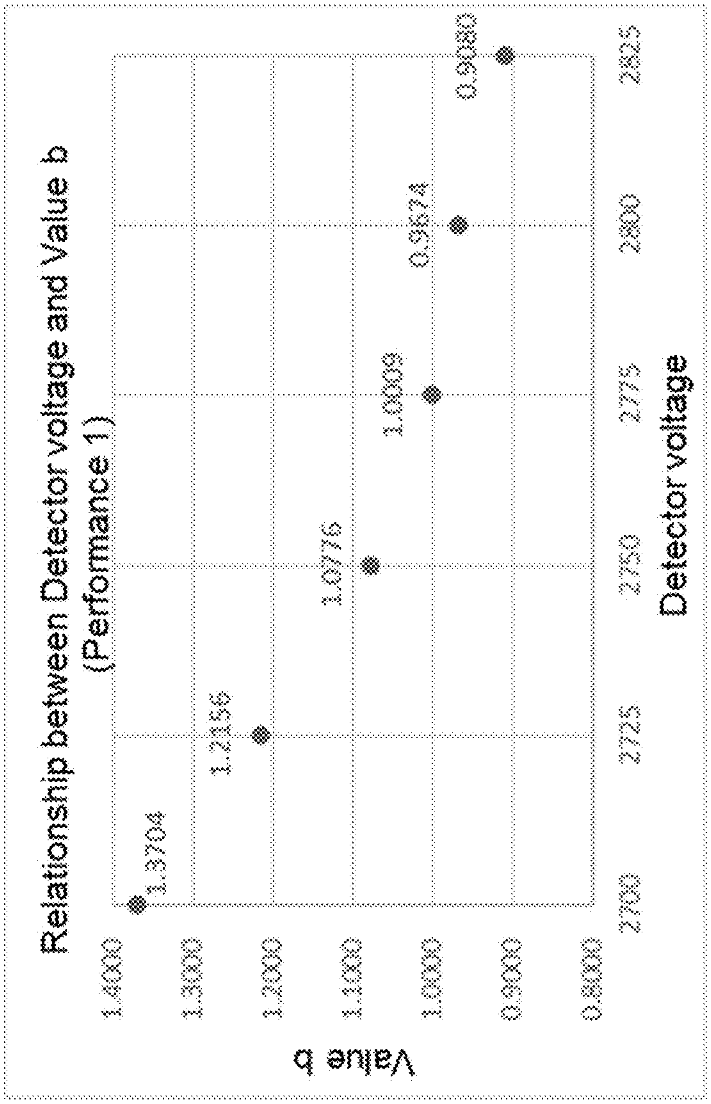
FIG. 18 shows a relationship between the detector voltage of Performance 1 and the value b of a calibration formula, wherein a vertical axis represents the value b and a horizontal axis represents the detector voltage.

The IC measurements were performed by the mass spectrometer (Performance 1) by setting the detector voltage to 2700 V, 2725 V, 2750 V, 2775 V, 2800 V, and 2825 V, respectively. As in the case of 2-3 in Example 2, a calibration formula (power approximate equation: $y=ax^b$) was determined using measurement results at different detector voltages. FIG. 18 is a diagram showing the relationship between the detector voltage and the value b of the calibration formula. The vertical axis represents the value b and the horizontal axis represents the detector voltage.

As shown in FIG. 17 and FIG. 18, it was confirmed that the value b tended to reduce as the detector voltage increased. When the value b was not less than 1.1, the value b was changed by about 0.15 by increasing the detector voltage by 25 V, and when the value b was not more than 1.1, the value b was changed by about 0.03 to 0.07 by increasing the detector voltage by 25 V.

When the value b increases due to, for example, deterioration of the detector, the value b can be adjusted to fall within a certain range by increasing the detector voltage by using such a relationship between the detector voltage and the value b. By adjusting the value b to fall within a certain range, the signal peak intensity ratios of analyte substances can more accurately be calibrated. For example, the value b may be adjusted to fall within a range of 0.9 to 1.1.

Example 4: Adjustment 2 of Calibration Value b

As another means for adjusting the value b, the baseline level of an analog-digital converter (AD converter) may be adjusted. Hereinbelow, the results of examination of a relationship among the value b, the baseline level setting of the AD converter, and the detector voltage will be shown.

IC measurements were performed using, as calibration substances, normal Aβ1-38 and stable isotope-labeled Aβ1-38 (SIL-Aβ1-38) which were the same in ionization efficiency. As IC1 to IC5, the same IC1 to IC5 as used in 2-2 in Example 2 were used.

Figure 19:
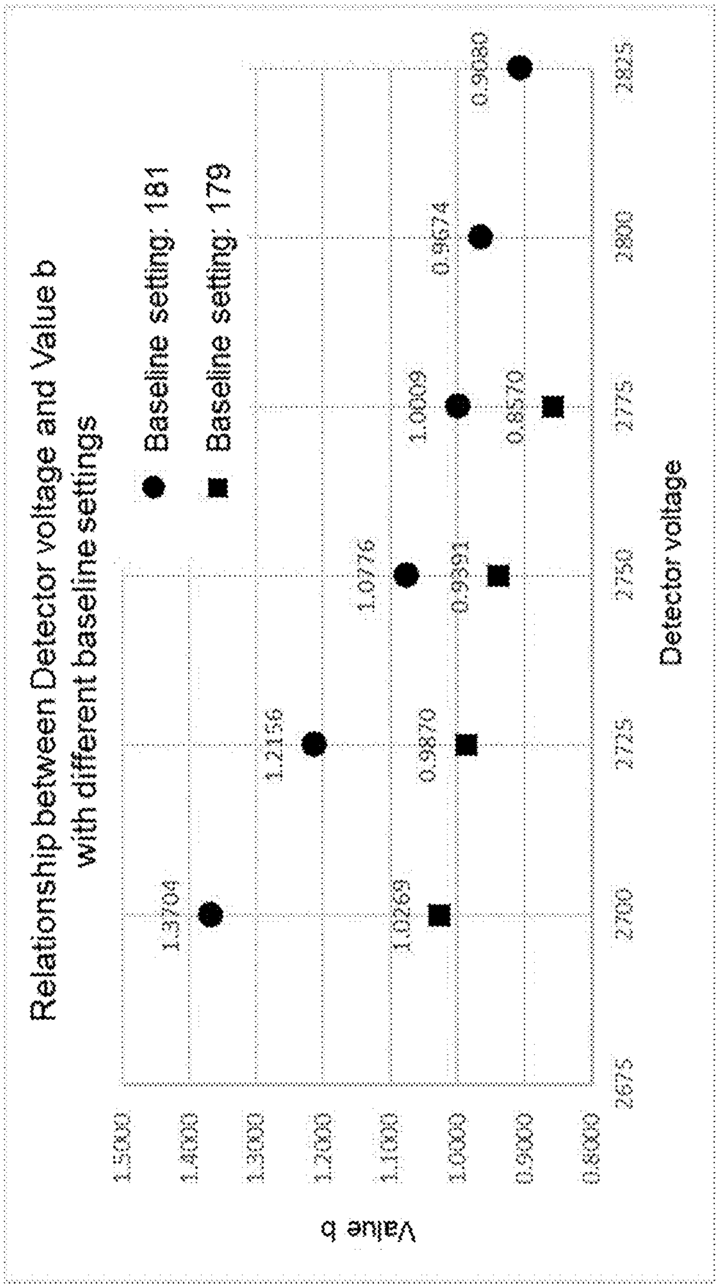
FIG. 19 shows a relationship between the baseline level of an AD converter of Performance 1 and the value b of a calibration formula, wherein a vertical axis represents the value b, a horizontal axis represents a detector voltage, and a relationship between the detector voltage and the value b when the baseline levels of the AD converter are 181 and 179 is shown.

The IC measurements were performed by the mass spectrometer (Performance 1) by setting the detector voltage to 2700 V, 2725 V, 2750 V, 2775 V, 2800 V, and 2825 V, respectively. Two baseline levels of the AD converter were set: one was a normal setting of 181, and the other was a state where the baseline level setting was reduced therefrom (179) so that a noise level was increased. Data was obtained at each of the two baseline levels. As in the case of 2-3 in Example 2, a calibration formula (power approximate equation: $y=ax^b$) was determined using measurement results at different detector voltages. FIG. 19 is a diagram showing the relationship between the detector voltage and the value b of the calibration formula. The vertical axis represents the value b and the horizontal axis represents the detector voltage (V). Data points of the baseline setting 181 are indicated by circular symbols, and data points of the baseline setting 179 are indicated by square symbols.

As shown in FIG. 19, it was confirmed that even at the same detector voltage, the value b tended to reduce by reducing the baseline level setting. When the value b was not less than 1.1, the value b was reduced by about 0.2 to 0.35 by reducing the baseline setting by 2, and when the value b was not more than 1.1, the value b was reduced by about 0.15 by reducing the baseline setting by 2.

When the value b increases due to, for example, deterioration of the detector, the value b can be adjusted to fall within a certain range by reducing the baseline setting by using such a relationship between the baseline setting of the AD converter and the value b. By adjusting the value b to fall within a certain range, the signal peak intensity ratios of analyte substances can more accurately be calibrated. For example, the value b may be adjusted to fall within a range of 0.9 to 1.1.

The present invention includes, for example, the following aspects.

(1)

A method for calibrating a difference in signal intensity ratio between machines in mass spectrometry, the method comprising the steps of:

- measuring a calibrant containing not less than two calibration substances by a mass spectrometer to obtain a signal peak of each of the calibration substances;
- determining a signal peak intensity ratio of, relative to a signal peak intensity of one calibration substance of the not less than two calibration substances, a signal peak intensity of another calibration substance;
- determining a calibration formula from the signal peak intensity ratio;
- measuring a sample containing not less than two analyte substances by the mass spectrometer to obtain a signal peak of each of the analyte substances;
- determining a signal peak intensity ratio of, relative to a signal peak intensity of one analyte substance of the not less than two analyte substances, a signal peak intensity of another analyte substance; and
- calibrating the signal peak intensity ratio of the analyte substances using the calibration formula.

(2)

The method according to the above (1), wherein the calibration substances include a substance labeled with a stable isotope and a substance not labeled with a stable isotope.

(3)

The method according to the above (1) or (2), wherein the analyte substances are selected from the group consisting of peptides, glycopeptides, sugar chains, lipids, and glycolipids.

(4)

The method according to any one of the above (1) to (3), wherein the calibration substances are Aβ related peptides.

(5)

The method according to any one of the above (1) to (4), wherein the calibration substances are Aβ1-38 and stable isotope-labeled Aβ1-38.

(6)

The method according to any one of the above (1) to (5), wherein the calibrant contains not less than three kinds of calibration substances.

(7)

The method according to any one of the above (1) to (6), wherein a number of the calibrants is two or more, and

- the calibrants are different in a concentration of at least one calibration substance of the calibration substances whose signal peak intensity ratio should be determined.

(8)

The method according to the above (7), wherein a ratio of, relative to a concentration of one of the calibration substances, a concentration of another calibration substance is in a range of ¼ to 4.

(9)

The method according to any one of the above (1) to (8), wherein in the step of determining a calibration formula, a calibration formula is determined using a value obtained by logarithmic transformation of the signal peak intensity ratio.

(10)

The method according to any one of the above (1) to (9), wherein the calibration formula is a linear, polynomial, exponential, logarithmic, or power calibration formula.

(11)

The method according to any one of the above (1) to (10), wherein a coefficient in the calibration formula is within a predetermined range.

(12)

The method according to the above (11), wherein the coefficient in the calibration formula is adjusted to fall within the predetermined range by adjusting a detector voltage and/or a baseline level in an AD converter of the mass spectrometer.

(13)

The method according to any one of the above (1) to (12), wherein the calibration formula is represented by a power approximate equation:

$$y = ax^b$$

wherein x is a signal peak intensity ratio or a concentration ratio as a reference, y is a signal peak intensity ratio obtained by a mass spectrometer for which a calibration formula should be determined, a is a coefficient in the approximate equation, and b is a coefficient in the approximate equation and a calibration value.

(14)

A machine difference calibration system of a mass spectrometer, the system comprising:

- a measuring method preparing unit for preparing a measuring method for measuring a calibrant for calculating a calibration value in a mass spectrometer; and
- a calibration value calculating unit for calculating a calibration value by analysis of mass spectrometry data obtained using the measuring method.

(15)

The machine difference calibration system according to the above (14), wherein the measuring method preparing unit includes a setting part that sets a previously-calculated laser power value as a laser power value used to measure the calibrant.

(16)

The machine difference calibration system according to the above (14) or (15), which includes a sample plate display part that displays a sample plate of the mass spectrometer.

(17)

The machine difference calibration system according to the above (16), wherein the sample plate display part shows sample dropping positions in the measuring method.

(18)

The machine difference calibration system according to any one of the above (15) to (17), wherein the setting part sets a laser power value different between sample wells and calibrant wells.

(19)

A machine difference calibration program of a mass spectrometer, the program including allowing a computer to execute a measuring method preparing step in which a measuring method for measuring a sample for calculating a calibration value in a mass spectrometer is prepared, and a calibration value calculating step in which a calibration value is calculated by analysis of mass spectrometry data obtained using the measuring method.

EXPLANATION OF REFERENCE SIGNS IN THE DRAWINGS

1: mass analysis unit
2: data processing unit
20: measuring method preparing unit
201: setting part
21: calibration value calculating unit
3: input unit
4: display init

The invention claimed is:

1. A method for calibrating a difference in signal intensity ratio between machines in mass spectrometry, the method comprising the steps of:

measuring a calibrant containing not less than two calibration substances by a mass spectrometer to obtain a signal peak of each of the calibration substances;

determining a signal peak intensity ratio of, relative to a signal peak intensity of one calibration substance of the not less than two calibration substances, a signal peak intensity of another calibration substance;

determining a calibration formula from the signal peak intensity ratio;

measuring a sample containing not less than two analyte substances by the mass spectrometer to obtain a signal peak of each of the analyte substances;

determining a signal peak intensity ratio of, relative to a signal peak intensity of one analyte substance of the not less than two analyte substances, a signal peak intensity of another analyte substance; and calibrating the signal peak intensity ratio of the analyte substances using the calibration formula.

2. The method according to claim 1, wherein the calibration substances include a substance labeled with a stable isotope and a substance not labeled with a stable isotope.

3. The method according to claim 1, wherein the analyte substances are selected from the group consisting of peptides, glycopeptides, sugar chains, lipids, and glycolipids.

4. The method according to claim 1, wherein the calibration substances are Aβ related peptides.

5. The method according to claim 1, wherein the calibration substances are Aβ1-38 and stable isotope-labeled Aβ1-38.

6. The method according to claim 1, wherein the calibrant contains not less than three kinds of calibration substances.

7. The method according to claim 1, wherein a number of the calibrants is two or more, and the calibrants are different in a concentration of at least one calibration substance of the calibration substances whose signal peak intensity ratio should be determined.

8. The method according to claim 7, wherein a ratio of, relative to a concentration of one of the calibration substances, a concentration of another calibration substance is in a range of ¼ to 4.

9. The method according to claim 1, wherein in the step of determining a calibration formula, a calibration formula is determined using a value obtained by logarithmic transformation of the signal peak intensity ratio.

10. The method according to claim 1, wherein the calibration formula is a linear, polynomial, exponential, logarithmic, or power calibration formula.

11. The method according to claim 1, wherein a coefficient in the calibration formula is within a predetermined range.

12. The method according to claim 11, wherein the coefficient in the calibration formula is adjusted to fall within the predetermined range by adjusting a detector voltage and/or a baseline level in an AD converter of the mass spectrometer.

13. The method according to claim 1, wherein the calibration formula is represented by a power approximate equation:

$$y = ax^b$$

wherein x is a signal peak intensity ratio or a concentration ratio as a reference, γ is a signal peak intensity ratio obtained by a mass spectrometer for which a calibration formula should be determined, a is a coefficient in the approximate equation, and b is a coefficient in the approximate equation and a calibration value.

* * * * *